United States Patent [19]
Barkans

[11] Patent Number: 5,929,862
[45] Date of Patent: Jul. 27, 1999

[54] ANTIALIASING SYSTEM AND METHOD THAT MINIMIZE MEMORY REQUIREMENTS AND MEMORY ACCESSES BY STORING A REDUCED SET OF SUBSAMPLE INFORMATION

[75] Inventor: Anthony C. Barkans, Fort Collins, Colo.

[73] Assignee: Hewlett-Packard Co., Palo Alto, Calif.

[21] Appl. No.: 08/692,350

[22] Filed: Aug. 5, 1996

[51] Int. Cl.$^6$ .................................................. G06F 15/00
[52] U.S. Cl. ......................... 345/431; 345/136; 382/212
[58] Field of Search ................................... 345/136, 431; 382/212

[56] References Cited

U.S. PATENT DOCUMENTS

| | | | |
|---|---|---|---|
| 4,811,245 | 3/1989 | Bunker et al. | 345/136 X |
| 5,220,650 | 6/1993 | Barkans | 395/163 |
| 5,428,810 | 6/1995 | Barkans et al. | 395/800 |
| 5,684,939 | 11/1997 | Foran et al. | 345/136 X |
| 5,701,365 | 12/1997 | Harrington et al. | 382/212 |

OTHER PUBLICATIONS

Exact: Algorithm and Hardware Architecture for an Improved A–Buffer; Schilling, et al., Computer Graphics, Annual Conference Series, 1993, pp. 85–91.

Reality Engine Graphics; K. Akeleym, Computer Graphics Proceedings, Annula Conference Series, 1993, pp. 109–116.
The Accumulation Buffer: Hardware Support for High–Quality Rendering; Haiberli, et al., Computer Graphics, vol. 24, No. 4, Aug. 1990.

*Primary Examiner*—Mark R. Powell
*Assistant Examiner*—Chanté E. Harrison

[57] ABSTRACT

An antialiasing system is implemented in a graphics system of a computer. A memory control is associated with graphics system for controlling a frame buffer. The antialiasing system is situated in the memory control and is configured to receive from steppers (edge and span) new color values and new depth dimensions z at a plurality of subpixel locations. In turn, the antialiasing system analyzes color data pertaining to each pixel in the frame buffer, and if necessary, updates the color data. The color data is unique and minimizes memory requirements and accesses. Specifically, the color data includes a current display value that corresponds to the pixel, a reference color value that corresponds to one subpixel location, a reference depth dimension that corresponds with the one subpixel location, and reconstruction indicia that correspond with other subpixel locations and that can be utilized to derive respective depth dimensions and colors for the other subpixel locations. The reconstruction indicia include a hint and a depth dimension difference. The hint indicates color informationm, and the depth dimension difference represents a difference between the reference depth dimension and a respective depth dimension.

36 Claims, 15 Drawing Sheets

ANTIALIASING SYSTEM AND METHOD THAT MINIMIZE MEMORY REQUIREMENTS AND MEMORY ACCESSES BY STORING A REDUCED SET OF SUBSAMPLE INFORMATION

FIELD OF THE INVENTION

The present invention relates generally to the field of computer graphics, and more particularly, to an antialiasing system and method for enhancing the quality of digitized images in a computer graphics system, while minimizing memory requirements and memory accesses. The invention is particularly suited for an interactive computer graphics system in that it provides for generation of high quality images at high speeds.

BACKGROUND OF THE INVENTION

The field of computer graphics concerns the creation, storage, manipulation, and display of pictures and models of objects by a digital processor. Interactive computer graphics is generally a subclassification in the field of computer graphics in which a user dynamically controls the picture's content, format, size, or color on a display surface by means of an interaction device, such as a keyboard, lever, or joystick. The creation of synthetic images (i.e., images which exist as abstract collections of lines, points, curves, etc. in the computer's memory) is the usual domain of interactive computer graphics.

There are two primary classes of interactive computer graphics systems: random-scan and raster-scan systems. Images displayed by a random-scan system are encoded as commands to draw each output primitive (i.e., point, line or polygon) by plotting individual points or drawing connecting lines between specified starting and ending coordinates of line segments. Polygons are simply treated as a closed series of line segments. Encoding for a raster-scan system is much simpler: output primitives are broken up into their constituent points for display. The major difference between a simple point-plotting random-scan system and a raster-scan system is in the organization of the stored data used to drive the display. As explained below, the data is stored in a "frame buffer" (also called a "refresh buffer").

In the random-scan system, the component points of each successive output primitive are stored sequentially in memory and are plotted in that order, one point at a time. This is because the beam may be moved randomly on the screen. In the raster-scan system, the refresh memory is arranged as a 2-dimensional array of data. The value stored at a particular row and column encodes an intensity and/or color value of a corresponding display element on the screen. By convention, the location of each display element is specified by a unique (X,Y) coordinate. Since each memory location defines a single point-sized element of an image, both the display screen location and its corresponding memory location are often called a "pixel," short for the image processing term "picture element."

The overall speed with which all or part of the stored image data can be changed is dependent upon, among other things, how fast the image creation system executes instructions. It is the image creation system's execution of instructions which is often the slowest process in creating or changing an image. This is because the "scan conversion" algorithm, which is described in more detail in the next paragraph, typically requires many iterations. Usually, the faster the scan conversion algorithm, the faster the overall system response time to user commands. In addition, it is known that response time is critical to user satisfaction and, perhaps more importantly, to user productivity.

The process of converting a line, point, and area representation of an image to the array of pixel data in the image storage system is called "scan conversion." Scan conversion algorithms are always needed in an interactive raster-scan graphics system and are usually incorporated into the image creation system. The scan conversion algorithm used in a raster-scan graphics system will be invoked quite often, typically thousands of times, each time an image is created or modified. Hence, it must not only create visually pleasing images, but must also execute as rapidly as possible. Indeed, speed versus image quality is the basic tradeoff in known scan conversion algorithms. Some scan conversion algorithms are fast and give jagged edges, while others are slower but give smoother edges. Edges that are jagged as a result of transformation into pixels are often referred to as "aliased", and further, the process of smoothing jagged edges is commonly referred to as "antialiasing."

The problem of antialiasing has been studied since the mid 1970's, when Frank Crow wrote about the problem. Crow identified three problem areas that give rise to aliasing in computer generated images. These three problem areas are as follows: edges on the silhouettes of objects, very small objects (subpixel), and areas of complicated detail (many subpixel parts of objects within a single pixel). It is interesting to note that the silhouette edges of polygons are where most people notice the aliasing problem. In fact, some people have considered the aliasing problem as only the silhouette edge problem. This has lead to some very bad solutions to the problem. The most notable of these solutions is to draw antialiased vectors around the edges of polygons. This concept falls apart as one starts to work with subpixel geometry and in complex regions of an image.

Alpha blending has been used to antialias images. The idea behind alpha blending is to find the percent coverage of a pixel by a polygon and then use that information to blend the new data into the background. The primary problem is that the data must be sorted in the depth dimension (z direction) of the screen space viewing cube. This is because at each pixel the frame buffer saves only the color information (i.e. no z data is saved). As an example of the need for z sorting, consider a pixel that is totally covered by part of a green polygon. Next, assume an edge of a red polygon is drawn in the same pixel, where only 50% of the pixel is covered. In that case the resultant pixel color will be computed as follows:

$$red(0.5)+((1.0\ green)(1.0-0.5))=0.5\ red+0.5\ green$$

This blend of red and green will be a good aesthetically pleasing mix if the red polygon is in front of the green one. If the green one is in front, then the red showing through will result in an incorrect appearance.

If the red is behind the green polygon, then the red should be drawn first resulting in a 50% red pixel. Next, the 100% green polygon should be drawn resulting in the following correct blend:

$$green\ (1.0)+((0.5\ red)\ (1.0-1.0))=1.0\ green+0.0\ red$$

For a typical application, the requirement that the data be transformed to screen space and then sorted is unreasonable. It is also important to note that, even with the data sorted in screen space, there are artifacts that occur when as few as two polygons share a common pixel. In other words, the alpha blending method does not handle regions of complicated detail.

Another known method for antialiasing is the accumulation buffer method. In principle, the accumulation buffer method can antialias any image. The idea is to render the image several times, where each time a different subpixel sampling grid is used. The results of several passes through the rendering are then combined to produce the final image. Dedicated hardware for use as an accumulation buffer has been discussed since the mid 1980's.

There are several features that make the accumulation buffer method attractive. One of the best features of this method is that images of very high quality can be produced. For example, images can be produced with 64 subsamples per pixel. In addition to antialiasing, the use of accumulation buffers works well to produce other sophisticated effects, such as motion blur and depth of field.

There are two primary disadvantages to the accumulation buffer method. First, performance is noticeably affected when antialiasing is enabled. Second, application programs need to be modified to take advantage of the method.

The first disadvantage can be explained as follows. In order to use an accumulation buffer, the database must be transformed and rendered several times. In addition, the final image must be assembled after the process is completed. So, an image with 4 subsamples per pixel will take about 5 times as long to render antialiased as compared to aliased. This performance problem can be alleviated with the use of progressive refinement. When using progressive refinement, the resultant image is displayed after each rendering pass. The net effect is that the image "appears" as getting progressively better. However, this changing image can be distracting to interactive work.

As for the second disadvantage of the accumulation buffer method, application programs must be changed to take advantage of the antialiasing. The application must resend the data through the transform and rendering process for each pass. In addition, the application needs to know what to do when the user wishes to change the view before all the passes through the data are complete. Up to this point in time, application writers have been unwilling to make these changes.

Still another known method for antialiasing is the multipoint sampling method. The multipoint sampling method allows each pixel to be sampled several times. The idea is to sample at several subpixel locations within each pixel. These samples are referred to herein as "subsamples." In this regard, it is similar to the accumulation buffer method. However, when using the multipoint sampling method, the data is transformed and sent to the rendering pipeline only once. The rendering hardware then uses the subpixel location data associated with each primitive to sample it at several subpixel locations at once.

The biggest advantage of the multipoint sampling method is that the application programs do not need to change. Other advantages are based on the fact that image data must be passed to the rendering hardware only one time. These advantages include: (1) the host processor does not do additional work to antialias the image; (2) the bus bandwidth required between the host and the graphics system is not affected by antialiasing; and (3) the transformation and lighting parts of the graphics pipeline are unaffected.

One of the disadvantages with the multipoint sampling method is that the image quality may not be as good as with the accumulation buffer method. This is because the multipoint sampling method requires storage (i.e. additional random access memory; RAM) for each subsample color and depth. Therefore, the number of subsamples per pixel is fixed by the hardware. For example, consider the "REALITYENGINE,"™ which is manufactured by and commercially available from Silicon Graphics Computer Systems, U.S.A. There is a limit of 4 subsamples per pixel in the high resolution mode (1280×1024) on this system with a single raster board. In order to increase the number of subsamples to 16 per pixel the user is forced to move to a four raster board Reality Engine. In contrast, when using an accumulation buffer, there is essentially no limit on the number of sampling passes possible. Of course, there is a performance penalty for increasing the number of passes through the data. The additional subsamples used with the accumulation buffer result in a higher quality image.

The next disadvantage is performance. Although the front end of the graphics pipeline is unaffected by use of the multipoint sampling method for polygon antialiasing, the scan conversion hardware must process all of the subsamples in parallel or else the scan converter may be the bottleneck. For example, when a single subsample requires the displayed image to change at a pixel location, then the multipoint method requires combining the data from all of the subsamples in order to produce the new display color. In traditional systems, this means that the scan converter must read all of the color data for the unchanging subsamples and the z data for the changing subsample. The scan converter must generate the new color and write the display color, the new color, and z values for the changed subsample. This undesirably requires far more data manipulation and memory accesses than conventional aliased display systems, and results in a significant performance penalty.

Possibly the biggest disadvantage of using the multipoint sampling method is the additional hardware cost. As stated above, each subsample requires storage. In addition, there is extra logic in the scan converter chips. However, the cost delta is dominated by the extra frame buffer storage. For example, a 1280×1024 display with 4 true color subsamples per pixel requires about 20 megabytes of additional frame buffer memory. This translates into a large factory cost.

SUMMARY OF THE INVENTION

An object of the present invention is to provide an antialiasing system and method for enhancing the quality of images in a graphics system, and particularly, an interactive graphics system.

Another object of the present invention is to provide an antialiasing system and method for a graphics system that exhibits higher speed and minimizes memory requirements and accesses as compared to prior art technologies.

Briefly described, the present invention provides an antialiasing system and method. The antialiasing system and method enhance the quality of and smooth edges in a digitized image. In terms of architecture, the antialiasing system can be implemented in, for example, a computer. The computer includes a processor, a memory, a graphics system, and an interface interconnecting the processor, the memory, and the graphics system. A frame buffer is associated with the graphics system. A memory control is associated with the graphics system for controlling the frame buffer. The antialiasing system is situated in the memory control and is configured to receive from steppers (edge and span) new color values and new depth dimensions z at a plurality of subpixel locations within a pixel in the digitized image. In turn, the antialiasing system analyzes color data pertaining to each pixel in the frame buffer, and if necessary based upon the incoming new color values and new depth dimensions, updates the color data.

Furthermore, the antialiasing system stores in the frame buffer unique set of color data that minimizes memory requirements and accesses. Specifically, the color data includes a current display value that corresponds to the pixel, a reference color value that corresponds to one subpixel location, a reference depth dimension that corresponds with the one subpixel location, and reconstruction indicia that correspond with other subpixel locations and that can be utilized to derive respective depth dimensions and colors for the other subpixel locations. In the preferred embodiment, the depth dimension approximation indicia include a hint and a depth dimension difference. The hint indicates color information concerning the respective subpixel location, and more particularly, the hint for each subpixel location prescribes one of the following: the subpixel location is not in use, the subpixel location is in use and matches the reference color value, the subpixel location is in use and is a mix with the reference color value, or the subpixel location is in use and unknown. Moreover, the depth dimension difference represents a difference between the reference depth dimension an a respective depth dimension.

The present invention can also be conceptualized as providing a novel methodology. The methodology is broadly stated as follows: determining a color value and a depth dimension at a plurality of subpixel locations within a pixel in the digitized image; storing in memory color data pertaining to each pixel, the color data including a current display value that corresponds to the pixel, a reference color that corresponds to one subpixel location, a reference depth dimension that corresponds with the one subpixel location, and reconstruction indicia (e.g., a hint and a depth dimension difference) that correspond with other subpixel locations and that can be utilized to derive respective approximate depth dimensions and colors for the other subpixel locations; retrieving the color data from the memory; and producing an antialiased display color from the color data.

The present invention has numerous advantages, a few of which are delineated hereafter, as mere examples.

An advantage of the antialiasing system and method is that less memory space is required to store the requisite information concerning subpixel subsamples.

Another advantage of the antialiasing system and method is that less memory accesses are required for generating high quality antialiased color values, as compared to prior art methodologies.

Another advantage of the antialiasing system and method is that high quality antialiased images can be produced with less expense as compared to prior art methodologies.

Another advantage of the antialiasing system and method is that images can be produced interactively with high quality, high speed, and minimal expense.

Other objects, features, and advantages of the present invention will become apparent to one of skill in the art upon examination of the following drawings and detailed description. It is intended that all such additional objects, features, and advantages be included herein within the scope of the present invention, as defined by the claims.

BRIEF DESCRIPTION OF THE DRAWINGS

The present invention can be better understood with reference to the following drawings. The components in the drawings are not necessarily to scale, emphasis instead being placed upon clearly illustrating principles of the present invention. Further, in the drawings, like reference numerals designate corresponding parts throughout the several views.

DETAILED DESCRIPTION OF THE PREFERRED EMBODIMENT

A preferred embodiment of the antialiasing system and method is set forth hereafter. Many modifications and variations to the preferred embodiment are possible without substantially departing from the spirit and the scope of the invention. All such modifications and variations are intended to be included herein within the scope of the present invention.

A. Antialiasing System

The antialiasing system 20 may be implemented in hardware, software, or a combination thereof. In the preferred embodiment, the antialiasing system 20 is implemented in hardware for purposes of achieving the highest speed possible; however, software implementations are possible, one of which is set forth in the Appendix to this Detailed Description section. When the antialiasing system 20 is implemented in software, it can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

Figure 1:
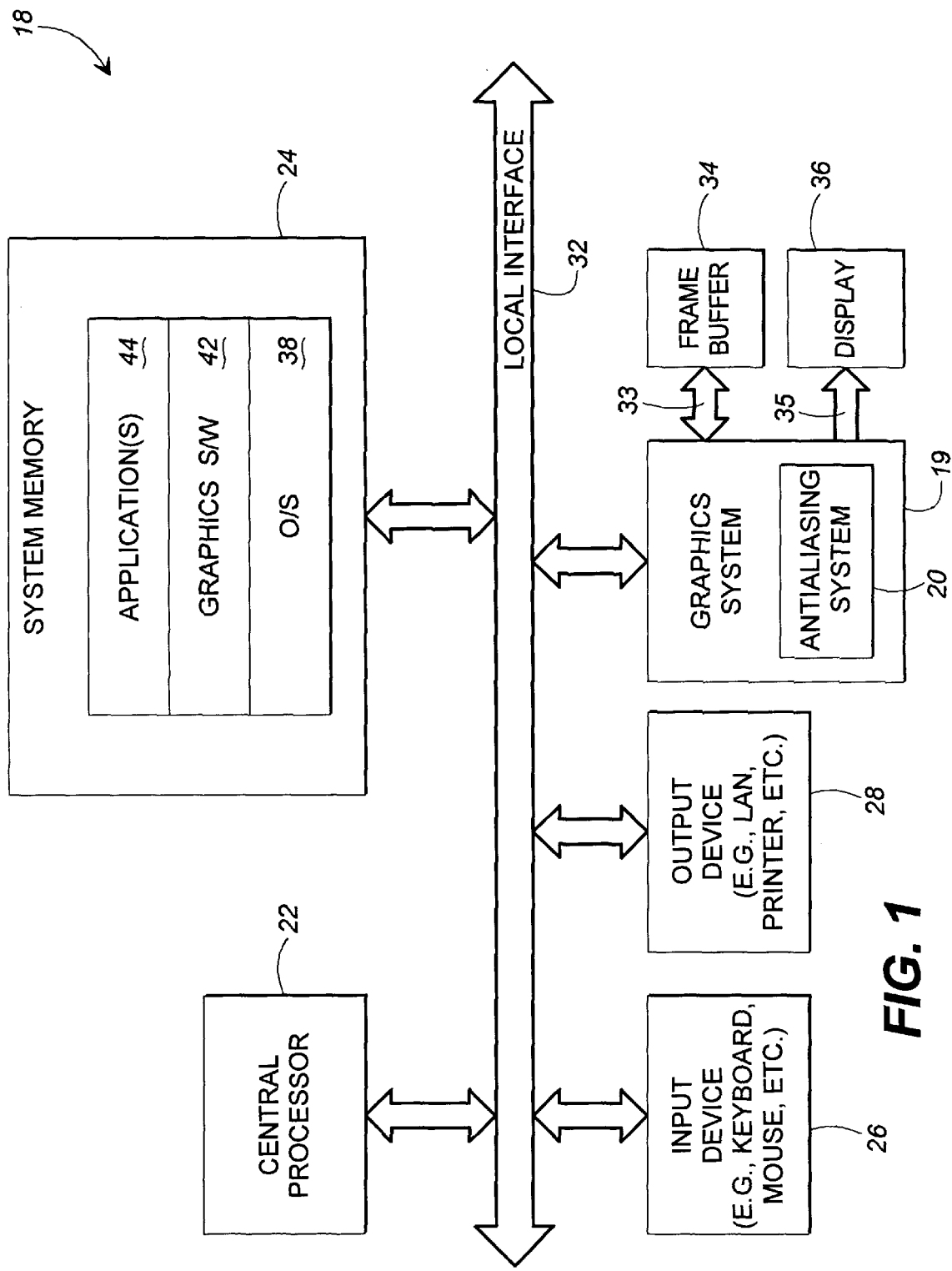
FIG. 1 is a block diagram illustrating a possible implementation of the antialiasing system and method of the present invention in a computer.

FIG. 1 shows a block diagram of a possible hardware implementation of the antialiasing system 20 within a computer 18 having a graphics system 19 that employs the antialiasing system 20. In architecture, the computer 18 includes the graphics system 19, a central processor 22, a system memory 24, an input device 26 (for example a keyboard, mouse, etc.), an output device 28 (for example, a local area network (LAN), printer, etc.), and a local interface 32 interconnecting the aforementioned elements. Moreover, associated with the graphics system 19 is a frame buffer 34 adapted to store digitized images for display and a display 36 for displaying digitized images. The antialiasing system 20 stores, updates, and antialiases display data in the frame buffer 34.

Software residing in the memory 24 configures and drives the processor 22 and, generally, the computer 18. The software includes an operating system 38, graphics software 42 situated logically and hierarchically over the operating system 38, and one or more applications 44 situated logically and hierarchically over the graphics software 42.

B. Multipoint Sampling of a Polygon (E. G., Triangle)

The antialiasing system 20 (FIG. 1) performs multipoint sampling of primitives, for example, polygons (e.g., triangles), vectors, points, etc., in order to accomplish its antialiasing functionality. However, unlike the prior art, the antialiasing system 20 stores only a fraction of the information regarding subsamples in the frame buffer 34 as compared to prior art systems, while still achieving high quality antialiasing. Also, because the antialiasing system 20 stores less data, there are less input/output (I/O) transactions with the frame buffer 34 as compared to the prior art, thereby leading to a further performance advantage.

Figure 2:
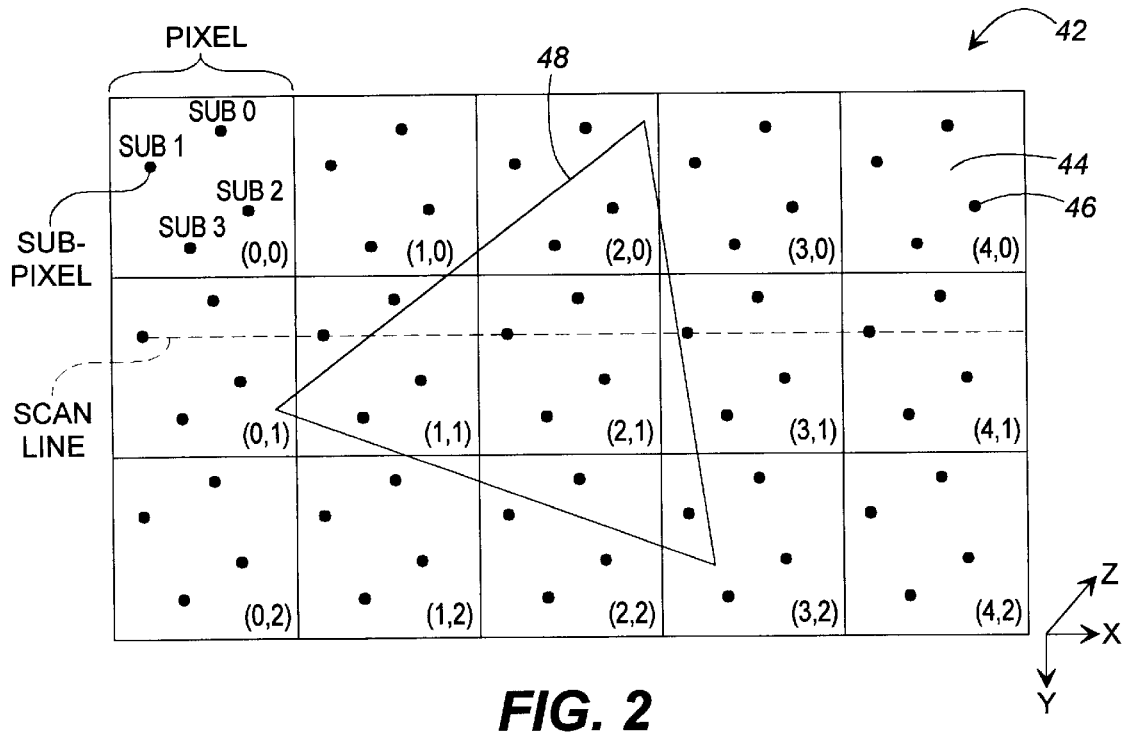
FIG. 2 is a graphical diagram illustrating the process of multipoint sampling of a triangle, which is employed by the antialiasing system of FIG. 1.

To understand the concept of multipoint sampling, FIG. 2 shows graphically (and schematically) a grid 42 that represents a plurality of contiguous square-shaped pixels 44. The grid lines are drawn at integer locations in both x and y directions in an x, y, z coordinate system. The subsamples 46 are shown as a plurality of dots labelled sub3-sub0 within each pixel 44. For this example, assume that a triangle 48 is drawn as a single flat color. In this case, the pixel 44 at x,y coordinates (2,0) would be displayed at one-half intensity. This is because only two of the four subsamples 46, specifically sub3 and sub2, are within the triangle 48. Note that the only one pixel 44 within the triangle 48 that would be drawn at full intensity would be the pixel 44 at x,y coordinates (2,1), because the triangle 48 covers all subsamples 46 (sub3-sub0) within this pixel 44.

C. Color Data

The antialiasing method, which is implemented by the antialiasing system 20 (FIG. 1), involves performing multipoint sampling of triangles and then storing an abridged version, or approximation, of the color and depth information pertaining to the subsamples 46, while achieving almost the same quality as if all of the information had been stored.

Figure 3:
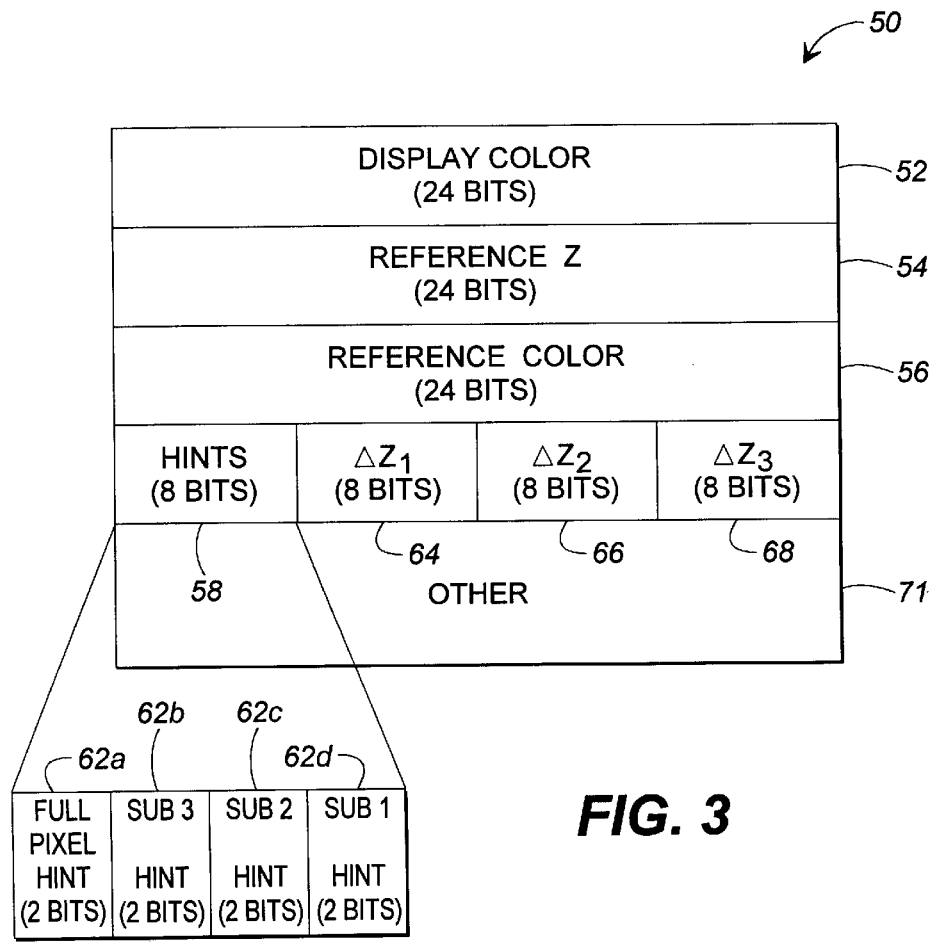
FIG. 3 is a schematic diagram illustrating color data of the invention that is stored for each pixel in a frame buffer of FIG. 1 in order to antialias the pixel with four subsamples.

FIG. 3 shows color data 50, pertaining to a pixel 44 and containing information regarding four subsamples 46 (i.e., sub0-sub4 in FIG. 2). Generally, with the information set forth in the color data 50 of FIG. 3, a high quality antialiased display color can be maintained and updated in the frame buffer 34 (FIG. 1) by the antialiasing system 20 in the graphics system 19. As scan conversion takes place, new color data and depth dimension z's pertaining to subsamples 46 within a pixel 44 are analyzed in view of the existing color data 50 corresponding with the pixel 44 by the antialiasing system 20, and the display color corresponding with the pixel 44 is updated accordingly.

With reference to FIG. 3, the color data 50 in the case of four subsamples 46 includes the following: (a) a display color 52 (preferably, 24 bits; 8 bits red, 8 bits green, 8 bits blue) that corresponds to the most recent display color of the pixel 44, (b) a reference z 54 (preferably, 24 bits) that corresponds to the depth dimension of one subsample 46 (normally, sub0, but in some instances not) contained within the corresponding pixel 44, (c) a reference color 56 (preferably, 24 bits) that corresponds with the one subsample 46 (normally, sub0), (d) a plurality of hints 58 (preferably, 8 bits) containing hints 62a–62d (preferably, 2 bits each) concerning the pixel 44 and depth dimensions z of other subsamples 46, (e) a depth dimension difference 64 ($\Delta z_1$; preferably, 8 bits) corresponding with sub1, (f) a depth dimension difference 66 ($\Delta z_2$; preferably, 8 bits) corresponding with sub2, (g) a depth dimension difference 68 ($\Delta z_3$; preferably, 8 bits) corresponding with sub3, and (h) finally other data 71 concerning the corresponding pixel 44. The other data 71 could include, for example but not limited to, stencil planes, alpha blending data, clip planes, etc.

In general, the hints 58 enable an approximation of three depth dimensions z to be stored. The hint 62a indicates information concerning the entire pixel 44. In the preferred embodiment, the coding of the hint 62a is set forth in the table A hereafter.

TABLE A

| FULL PIXEL | HINT | MEANING |
| --- | --- | --- |
| 0 | 0 | Pixel not in use |
| 0 | 1 | All four subsamples in use |
| 1 | 0 | Sub0 is not in use and at least one or more other subsamples are in use |
| 1 | 1 | Sub4 is in use and other subsamples may be in use |

The sub3 hint 62b, the sub2 hint 62c, and the sub1 hint 62d correspond and provide color information regarding sub3, sub2, and sub1, respectively. In particular, Table B hereafter sets forth the encoding/decoding of the bits pertaining to the hints 62b–62d.

TABLE B

| SUBi | HINT | MEANING |
| --- | --- | --- |
| 0 | 0 | Subsample not in use |
| 0 | 1 | Subsample in use and matches color of reference subsample |
| 1 | 0 | Subsample in use and color is a mix with the reference subsample |
| 1 | 1 | Subsample is in use but the color is unknown. (If necessary, force to reference.) |

The depth dimension differences $\Delta z$ are stored in a compressed manner within the color data 50 in order to further enhance performance by minimizing storage requirements. In this regard, the depth dimension differences $\Delta z$'s are first computed from the reference z 54 and the depth dimensions z's by taking the difference between the reference z and the corresponding depth dimension z. As an example, consider the case where the reference z=0×1007 (hex; base 16) and the depth dimension $z_1$ is 0×1002 (hex). In this case, $\Delta z_1$ is equal to the reference z-$z_1$, or 0×5 (hex), or "000000000000000000000101" (24 bit binary). In order to determine the $\Delta z_1$ that is stored in the color data 50 (FIG. 3), either the leading 1's or 0's are counted in the $\Delta z_1$ binary expression. In other words, all of either the 1's or 0's leading up to the bit involved in the first transition (from 1 to 0 or from 0 to 1) are counted. In this example, there are 20 leading 0's. Moreover, the next three most significant bits are "010". As a result, the depth dimension difference $\Delta z_1$ that is stored in the color data 50 is "10100010", where "10100" represents the number (20 in decimal) of leading 0's, and "010" represents the three most significant bits (MSBs).

As another example, consider that reference z=0×1007 and the depth dimension $z_2$=0×1008 (hex). In this example, the $\Delta z_2$ is equal to the reference z minus the depth dimension $z_2$, or −1 (hex), or "111111111111111111111111" (binary) As a result, the binary expression "10101111" is stored for the depth dimension difference $\Delta z_2$, where the part "10101" (21 in decimal) represents the number of leading 1's and "111" (7 in decimal) represents the three most significant bits.

D. Graphics System

Figure 4:
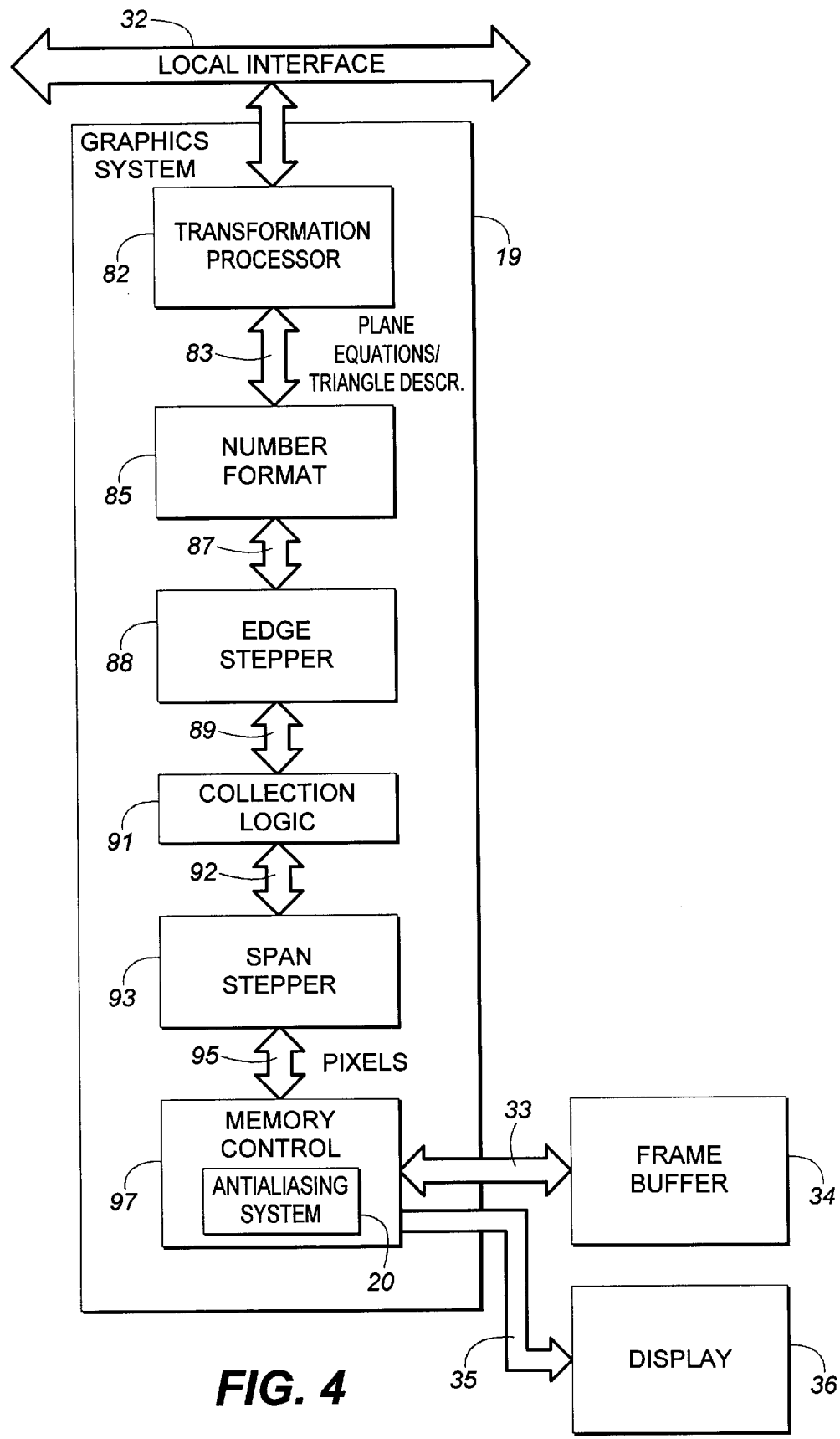
FIG. 4 is a block diagram illustrating the graphics system and antialiasing system of FIG. 1.

The graphics system 19 (FIG. 1) is shown in further detail in FIG. 4. As shown in FIG. 4, in architecture, the graphics system 19 includes a transformation processor 82 in communication with the local interface 32, a number format mechanism 85 in communication with the transformation processor 82 as indicated by reference arrow 83, an edge stepper 88 in communication with the number format mechanism 85 as indicated by reference arrow 87, collection logic 91 in communication with the edge stepper 88 as indicated by reference arrow 89, a span stepper 93 in communication with the collection logic 91 as indicated by reference arrow 92, a memory control 97 in communication with the span stepper 93 as indicated by reference arrow 95, The memory control 97 includes the antialiasing system 20, and the memory control 97 communicates with the frame buffer 34 as indicated by reference arrow 33 and with the display 36 as indicated by reference arrow 35, The transformation processor 82 communicates data with the central processor 22 (FIG. 1) related to the graphics display 36, as indicated by reference arrow 18. The transformation processor 82 essentially processes received data into plane equations that define polygons, such as triangles. For purposes of simplicity, the antialiasing system 20 will be described herein in terms of processing triangles, but the principles of the system 20 apply to other polygons, vectors, and points, as well. The plane equations generally include vortices, formulas for edges, the rates of change of the depth dimension z, or dz/dx and dz/dy, and rates of change of colors and textures.

The number format mechanism 85 receives the plane equations and triangle descriptions from the transformation processor 82, as indicated by reference arrow 83. The number format mechanism 85 converts the inputs from a floating point format to a fixed point format.

The edge stepper 89 receives the fixed point data 87 from the number format mechanism 85 and determines the location of edges.

The collection logic 91 receives the spans 89 from the edge stepper 88 and temporarily stores the information.

The span stepper 93 receives the spans 92 from the collection logic 91 and is configured to step along each span to generate pixel values 95.

The memory control 97 receives the pixel values 95 from the span stepper 93. The memory control 97 is configured to store and retrieve pixel values in the frame buffer 34, as indicated by bidirectional reference arrow 33.

The antialiasing system 20 maintains and updates a high quality antialiased display color for each pixel 44 in the frame buffer 34. As scan conversion takes place, new color data and depth dimension z's pertaining to subsamples 46 within a pixel 44 are received by the system 20 from the span stepper 93 and analyzed by the system 20 in view of the existing color data 50 from the frame buffer 34 corresponding with the pixel 44. Moreover, the display color corresponding with the pixel 44 is updated accordingly by the antialiasing system 20.

E. First Embodiment of the Antialiasing System

Figure 5A:
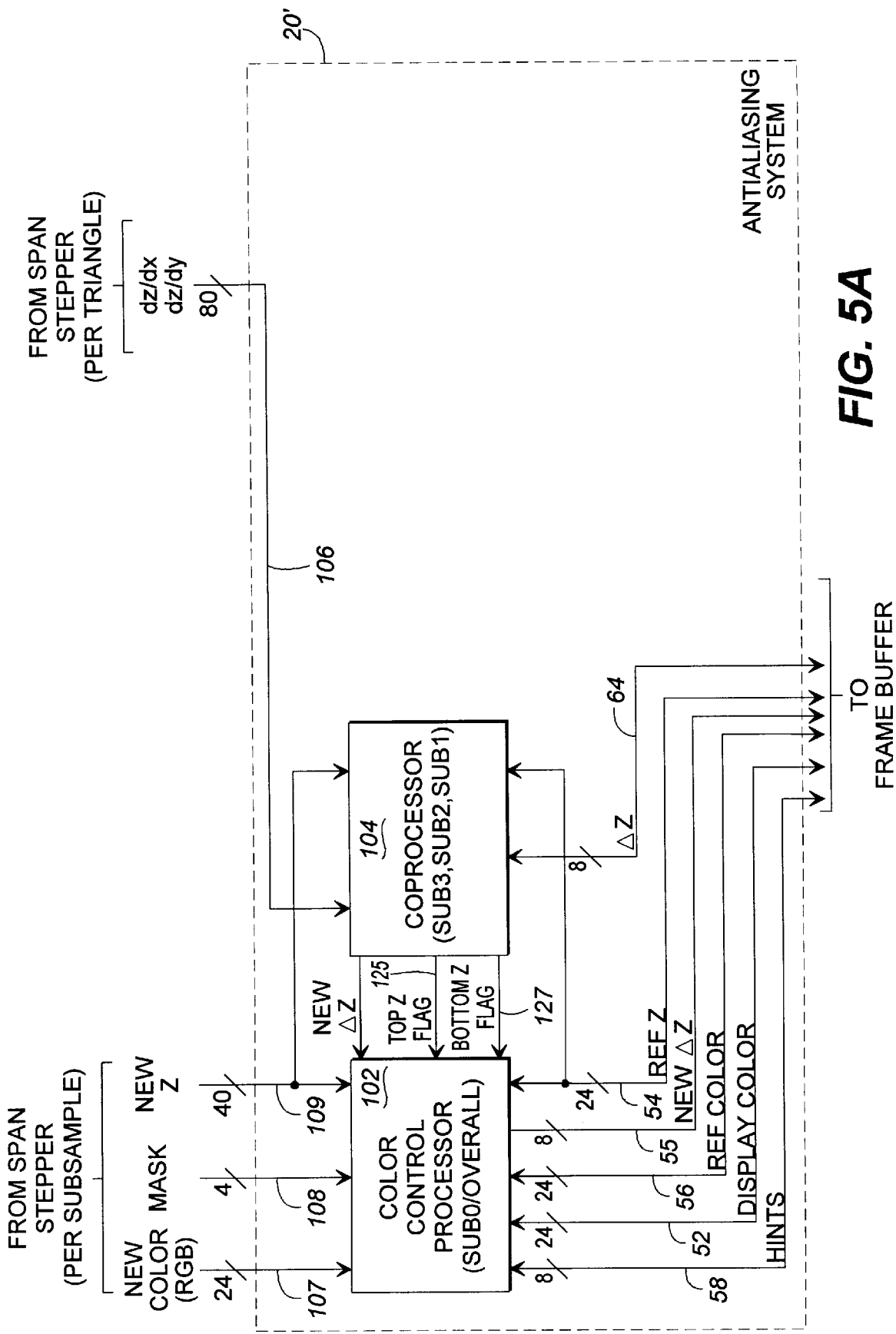
FIG. 5A is a block diagram illustrating a first embodiment of the antialiasing system of FIGS. 1 and 4.

A first embodiment of the antialiasing system 20 in the memory control 97 of the graphics system 19 is set forth in FIG. 5A and denoted generally by reference numeral 20'. A second embodiment of the antialiasing system 20 is set forth in FIG. 5B and generally denoted by reference numeral 20". The first embodiment is less complex and requires less logic than the second embodiment, but the second embodiment is a faster implementation. These embodiments are described in detail immediately hereafter.

1. First Embodiment of the Antialiasing System

Referring to FIG. 5A, the antialiasing system 20' includes a color control processor 102 interconnected with a coprocessor 104. The color control processor 102 serves as the central control for the system 20' as well as the primary processor for the reference subsample in a pixel 44, which in the preferred embodiment, is normally subsample sub0. In some instances, the reference is different. For example, in the preferred embodiment, when sub0 is not in use (in FIG. 2, pixel 44 at x,y coordinates (2,0)), then the subsample 46 with the lowest indice (i.e., sub2 in FIG. 2 at coordinates (2,0)) will be selected as the reference subsample.

In the antialiasing system 20', all of the color information pertaining to the reference subsample 46 is stored in the frame buffer 34, while for each of the other subsamples (normally, sub3-sub1), less than a complete set of color information is stored in the frame buffer 34.

For each subsample 46, the color control processor 102 is configured to receive from the span stepper 93 (FIG. 4) the following: a new color 107 (a binary value, preferably, 24 bits), a new z 109 (a binary value, preferably, 40 bits), and a mask 108 (preferably, 4 bits) identifying either (a) the particular subsample 46 associated with the new z 109 (i.e., mask=0001=sub0, 0010=sub1, 0100=sub2, 1000=sub3) or (b) that all subsamples 46 of the entire pixel 44 are in use with new z 109 being the z value at sub0 (i.e., mask=1111), In the latter case, the z values at each of sub3-sub1 are computed algebraicly from the new z, dz/dx, and dz/dy (by new sub z computation mechanism 119 in FIG. 6), where dz/dx and dz/dy preferably form an 80 bit value in the aforementioned example as indicated in FIG. 5A. For example, if the location of sub1 is ⅝ pixels in the x direction and ⅜ pixels in the y direction, then z1=(new z)+(⅝)*(dz/dx)+(⅜)*(dz/dy).

The color control processor 102 also receives a new $\Delta z_3$, $\Delta z_2$, and $\Delta z_1$, which may or many not be used by the control processor 102, from the coprocessor 104, which computes the forgoing parameters. Further, the color control processor 102 receives the following information pertaining to the pixel from the frame buffer 34: hints 58 (preferably, 8 bits), the current display color 52 (preferably, 24 bits), the reference color 56 (preferably, 24 bits), and the reference z 54 (preferably, 24 bits) from the frame buffer 34.. Based upon the aforementioned data, the color control processor 102 determines how to update the color data 50 (FIG. 3) in the frame buffer 34. The control processor 102 reconstructs what should be seen on the display and updates the color data 50. The coprocessor 104 is configured to generate a new $\Delta z_3$, $\Delta z_2$, $\Delta z_1$ on successive cycles for processing by the color control processor 102. The $\Delta z$'s are utilized by the control processor 102 whenever the system 20 is not working on the reference subsample 46. As examples, the system 20 would not be working on the reference subsample 46 when processing sub3 in the pixel 44 having x,y coordinates (2,0) in FIG. 2 or sub3-sub1 in the pixel 44 having x,y coordinates (2,1) in FIG. 2.

Furthermore, the coprocessor 104 does comparisons between old and new z's. More specifically, if based on the hints 58, the control processor 102 determines that a subsample 46 at issue has already been utilized in the frame buffer 34, then the control processor 102 must determine whether the old z is in front of the new z, or vice versa. The coprocessor 104 determines this relationship and provides flags 125, 127 indicative thereof, as will be further described hereinafter.

In order to accomplish the foregoing functionality, the coprocessor 104 is configured to receive the values dz/dx and dz/dy from the span stepper 93 (ultimately from the transformation processor 82; both of FIG. 4), as indicated by reference arrow 106, on a per triangle basis. Then, for each subsample 46, the coprocessor 104 receives the following data: the new z 109 from the span stepper 93 (FIG. 4) and Δz 64 from the frame buffer 34. Based upon the foregoing values 64, 106, 109, the coprocessor 104 produces the new Δz and new-to-old z relationship for the subsample 46 and provides them to the color control processor 102, which may or may not use the new Δz.

Figure 5B:
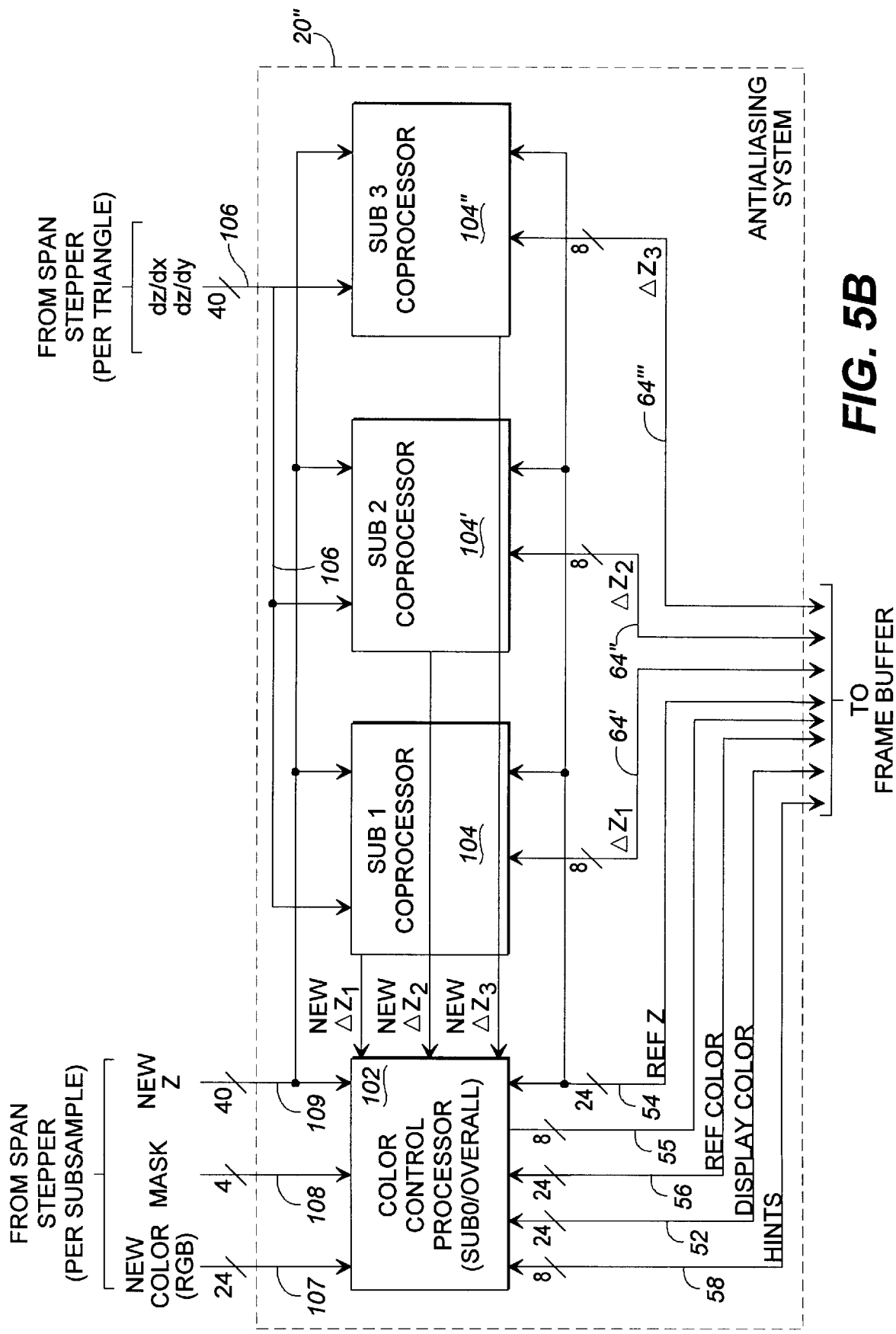
FIG. 5B is a block diagram illustrating a second embodiment of the antialiasing system of FIGS. 1 and 4.
Figure 6:
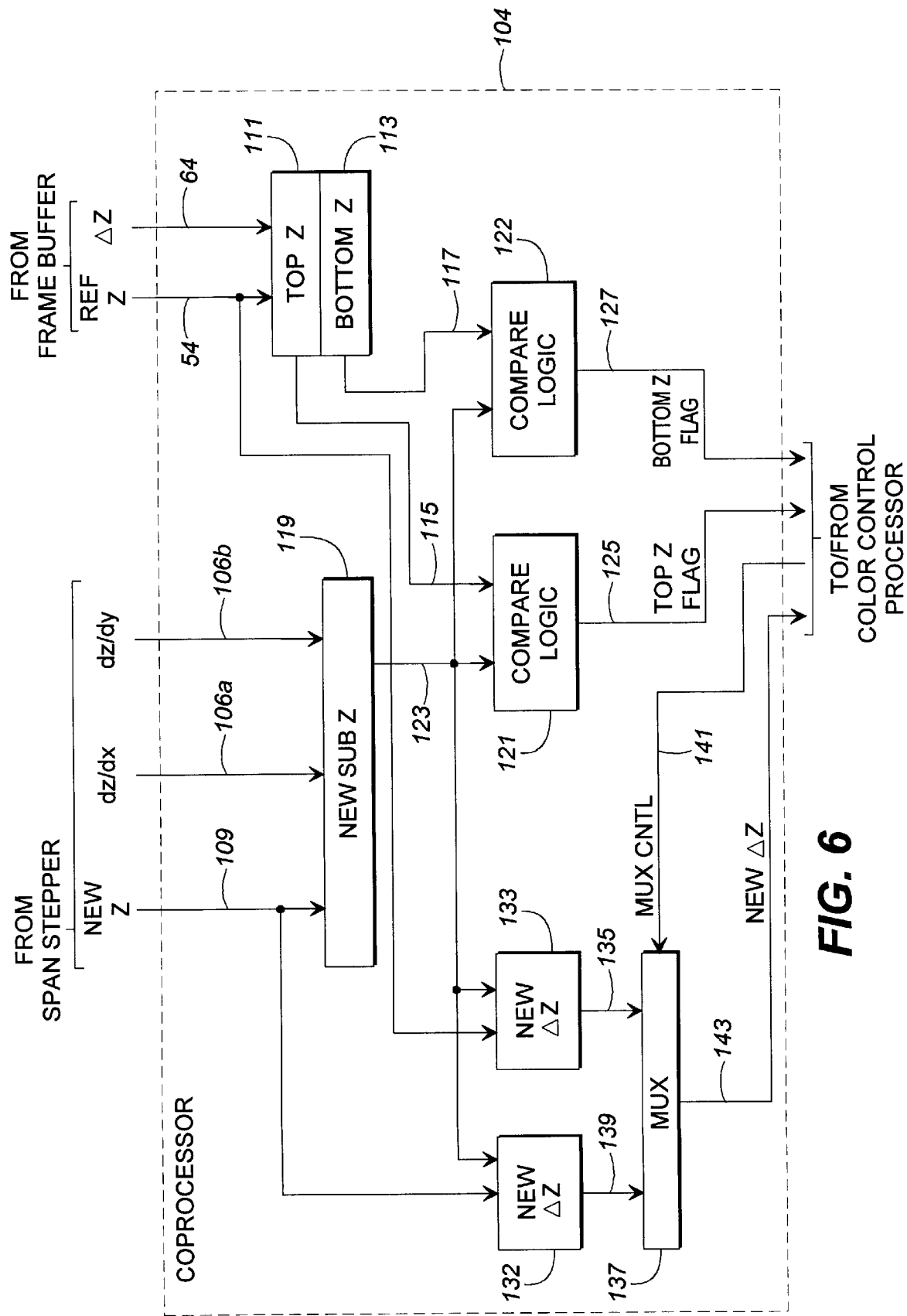
FIG. 6 is a block diagram illustrating a subsample coprocessor of FIGS. 5A and 5B.

FIG. 6 is a detailed block diagram of the coprocessor 104 (FIG. 5A as well as FIG. 5B). In architecture, the coprocessor 104 includes components for identifying the new-to-old z relationship from the reference z 54 and Δz 64. Because the depth dimension differences Δz are stored in a compressed approximate format, there is some uncertainty when the old z is recreated. The components for resolving this uncertainty are as follows.

Top and bottom z computation mechanisms 111, 113 receive the reference z 54 and the Δz 64 from the frame buffer 34 and compute respective top and bottom z's. The top and bottom z's are produced by first expanding Δz 64 to include its full binary representation along with its unknown bits. The unknown bits for the top z are all set to a logical 1, whereas the unknown bits for the bottom z are all set to a logical 0. After this expansion, the reference z 54 is added to each of the expanded values to create the top and bottom z's.

If the new z 109 is less than the bottom z in mechanism 113, then the present subsample 46 represents something that is behind the old subsample 46 on the display, and, therefore, the old z is ultimately kept. This outcome assumes that a z rule has been adopted where the greater z wins. On the other hand, if the new z 109 is greater than the top z in mechanism 111, then the color data 50 corresponding with the subsample 46 is updated with the new z 109. Finally, when the new z 109 falls between the top and bottom z within the mechanisms 111, 113, then the color control processor 102 will ultimately make a decision whether to select the new value z 109 or the old value z. In this case, where the new z falls between the top and bottom z's, then the hint is forced to "11" (unknown) and the reference color is used as the best approximation. Further, the existing z is maintained unchanged, which is the most conservative approach.

In order to perform the aforementioned comparison operations with the top and bottom z's, the coprocessor 104 includes a new sub z computation mechanism 119 and compare logics 121, 122. Generally, the new sub z computation mechanism 119 computes the precise z for subsamples 46 when the mask 108 is "1111"; otherwise, the new sub z computation mechanism 119 will pass the new z straight through unchanged.

To accomplish the forgoing functionality, the new sub z computation mechanism 119 receives the new z 109, the dz/dx 106a, and the dz/dy 106b, all from the span stepper 93. When the mask is "1111", then the new sub z computation mechanism 119 generates a new sub z corresponding with the subsample 46 by mathematically combining dz/dx 106a and dz/dy 106b with the new z 109. In the case when the mask 108 is "0001", "0010", "0100", or "1000", then the new z 109 is produced at the output. The mechanism 119 then forwards the appropriate value to the compare logic 121, as indicated by reference arrow 123. The compare logic 121 also receives the top z 115 from the top z computation mechanism 111. Based upon the values 123, 115, the compare logic 121 generates a top z flag 125, which is indicative of whether or not the new sub z 123 is equal to or greater than the top z. Moreover, the compare logic 122 receives the new sub z 123 and the bottom z 117 from the bottom z computation mechanism 113. Based upon these values 123, 117, the compare logic 122 generates a bottom z flag 127, which is indicative of whether or not the new sub z is equal to or less than the bottom z 117.

Thus, when the flags 125, 127 exhibit 10, then the color processor 102 knows to select the new z 109. When the flags 125, 127 exhibit 01, then the color processor 102 knows to select the old z. When the flags 125, 127 exhibit 00, then the color processor 102 knows to select either the new z or the old z based upon a predetermined z rule.

The coprocessor 104 is provided with new Δz computation mechanisms 132, 133. When the mask 108 is "1111", then the new z 109 corresponds with the value z at sub0, and the Δz for sub3-sub1 is computed via the Δz computation mechanism 132 in the coprocessor 104. Otherwise, in the case where there is no sub0, then the Δz for sub3-sub1 is computed via the Δz computation mechanism 133 in the coprocessor 104.

More specifically, the new Δz computation mechanism 133 receives the reference z 54 and the new sub z 123. Essentially, the new Δz computation mechanism 133 subtracts the values 54, 123 in order to produce a new Δz 135 that is passed to a multiplexer (MUX) 137. This new Δz 135 represents the distance between the reference z and the z corresponding with the subsample 46 at issue. This new Δz 135 can be utilized by the color processor 102 in the color data 50 (FIG. 3) to represent a depth dimension difference $\Delta z_3$, $\Delta z_2$, $\Delta z_1$, denoted by respective reference numerals 64, 66, 68 (FIG. 3).

The new Δz computation mechanism 132 receives the new z 109 and the new sub z 123, subtracts the values 109, 123, and produces a new Δz 139 for the MUX 137. This new Δz 139 represents the distance between the new z and the z corresponding with the subsample 46 at issue. This new Δz 139 can be utilized to represent a depth dimension difference 64.

The MUX 137 is controlled by the control processor 102 (FIG. 5A or 5B), as indicated by reference arrow 141 to output a new Δz 143. As mentioned, the new Δz 143 is conditionally written to the color processor 102, and if the subsample 46 has a rendering defined by the present color data 50 in front of it, then it is not used.

Figure 7:
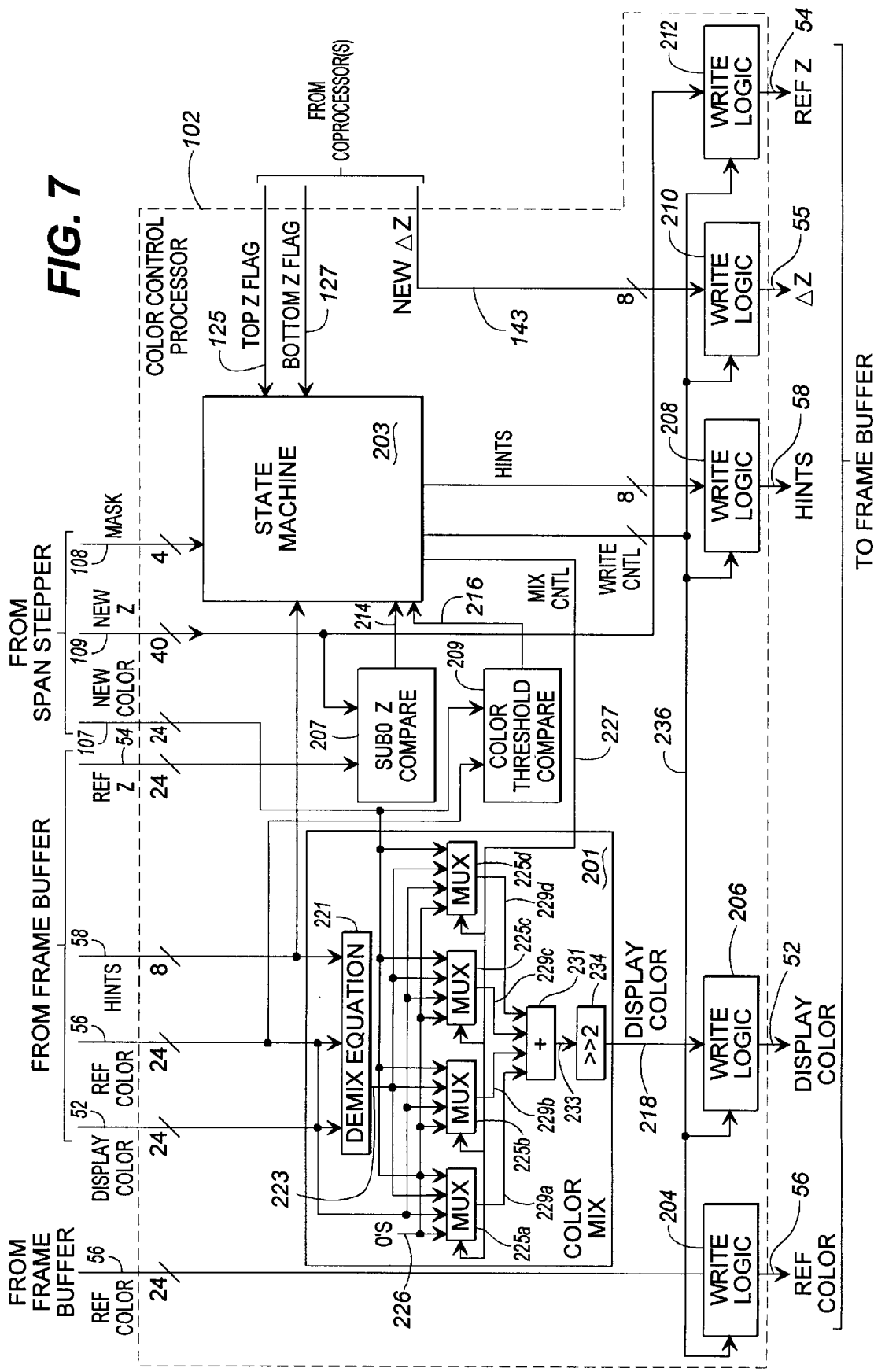
FIG. 7 is a block diagram illustrating a color control processor of FIGS. 5A and 5B.

FIG. 7 shows a block diagram of the color control processor 102 (FIGS. 5A or 5B). The color control processor 102 includes a state machine 203, color mix logic 201, sub0 z compare logic 207, color threshold compare logic 209, and write logics 204, 206, 208, 210, 212.

The state machine 203 generally controls the components and sequencing of the color control processor 102. The state machine 203 executes algorithms, in hardware, that are set forth in the flow charts of FIGS. 8A–8H. The algorithms reduce memory requirements and I/O accesses to the frame buffer 34 by implementing the storage of color data 50 (FIG. 3). The state machine 203 receives the hints 58 from the frame buffer 34, the mask 108 from the span stepper 93, the top and bottom z flags 125, 127 from the coprocessor 104, the Δz 143 from the coprocessor 104, a sub0 z compare indicator 214 indicative of whether the new z 109 should be used as the new reference z for the reference sub0, and a color threshold compare signal 216 indicative of whether the new color 107 is sufficiently close to the reference color 56, i.e. within a predefined threshold, in which case the new color 107 would be aliased as the reference color 56. The architecture and the functionality of the state machine 203 will be better understood with reference to the flow charts in FIGS. 8A–8H which are described in detail later in this document.

The color mix logic 201 receives the display color 52, the reference color 56, and the hints 58, all from the frame buffer 34, and based upon the foregoing signals, the color mix logic 201 generates a new display color 218. In essence, the color mix logic 201 blends the colors pertaining to subsamples 46 in order to arrive at a display color 218 for the pixel 44. The color mix logic 201 accomplishes this by first passing the display color 52, the reference color 56, and the hints 58 to a demix equation mechanism 221 which implements the following equation in order to determine an unknown color:

$$\text{display color} = \frac{((\text{number of subsamples that are the same color as reference}) * \text{reference color}) + ((\text{number of subsamples that are mix}) * \text{mix color})}{4}$$

In the equation, the "number of subsamples that are the same color as the reference" is determined by summing the number of hints 62a–62d that exhibit "01" or "11". Moreover, the "number of subsamples that are a mix is calculated by summing the hints 62b–62d that exhibit "10".

Based upon the aforementioned equation, the demix equation mechanism 221 produces an output 223 indicative of the unknown color. The output 223 is passed to four MUX's 225a–225d, which correspond respectively with su3-sub0. Each of the MUX's 225a–225d, in addition to the output 223, receives a 0's value 226 (used when a particular subsample 46 is not in use within a pixel 44), the reference color 56, and the new color 107. The MUX's 225a–225d are controlled by the state machine 203, as indicated by reference arrow 227, so that one of the values 226, 56, 223, 107 are output from each MUX 225–225d. The MUX's 225a–225d produce respective outputs 229a–229d for an addition mechanism 231. The addition mechanism 231 adds the values 229a–229d corresponding with the subsamples sub3-sub0 to produce a sum 233, which is indicative of a display color for the entire pixel 44. The color value 233 is next shifted by two binary positions, i.e., the color value 233 is divided by four in decimal, via a shift mechanism 234. The shift mechanism 234 generates the display color 218.

The sub0 z compare logic 207 receives the reference z 54 from the frame buffer 34 and the new z 109 from the span stepper 93. The sub0 z compare logic 207 determines for sub0 whether or not the new z 109 should replace the old reference z 54 based upon their relationship along the z axis. The compare logic 207 produces a signal 214 indicative thereof for the state machine 203.

The color threshold compare logic 209 receives the reference color 56 and the new color 107, subtracts the foregoing values, and compares the result to a predetermined threshold in order to determine whether or not the new color 107 is sufficiently close to the reference color 56 so that the new color 107 can be aliased by the reference color 56. The color threshold compare logic 209 produces a compare signal 216 for the state machine 203 to indicate the result of this operation. This compare operation helps determine if the hints 62a–62d should indicate that the respective subsample color is either the same as the reference color 56 (hint="01") or is not the same (hint="10" or hint="11").

Write logics 204, 206, 208, 210, 212 are controlled by the state machine 203, as indicated by reference arrow 236 and, upon command by the state machine 203, output the reference color 56, the display color 52, hints 58, Δz 55, and reference z 54, respectively.

a. State Machine Algorithms

The algorithms employed by the hardware in the state machine 203 (FIG. 7) will now be described with reference to the flow charts of FIGS. 8A through 8H. Generally, the mask 108 determines the entry point into the algorithms.

1. Mask Equals "1111"

Figure 8A:
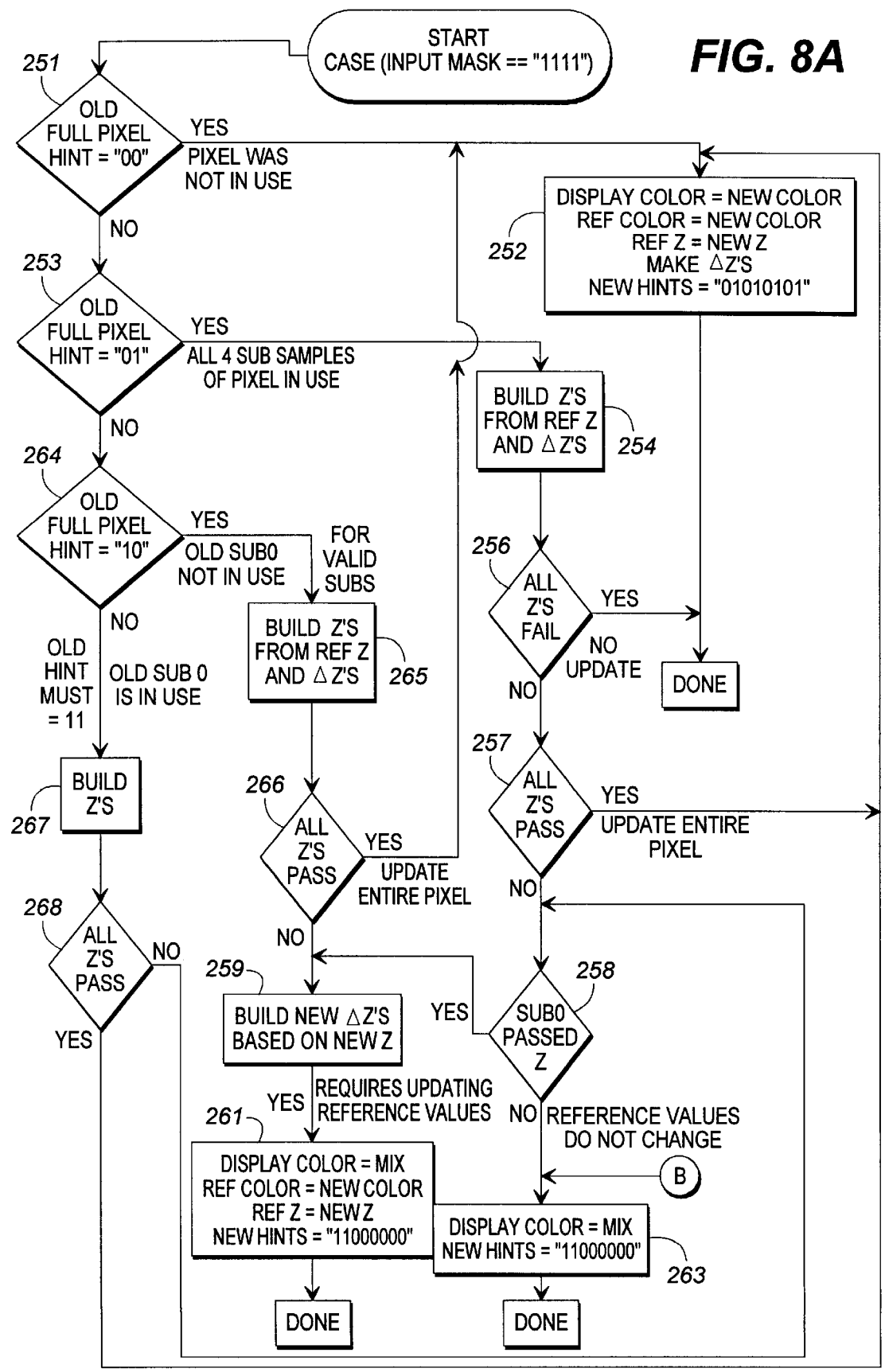
FIGS. 8A–H show flow charts of algorithms for driving the state machine of the color control processor of FIG. 7.

Referring to FIG. 8A, when the mask 108 is "1111," then the pixel 44 is totally covered by the new color 107. An example of this pixel 44 is that shown in FIG. 2 at coordinates (2,1).

First, the full pixel hint 62a (FIG. 3) is examined, as indicated at block 251. If the hint 62a is "00", indicating that the pixel is not previously in use, then as set forth at block 252, the color data 50 (FIG. 3) is updated to the new values that are received by the antialiasing system 20.

To the contrary, if the old full pixel hint 62a is not "00", then the operations set out in block 253 are performed. As indicated at block 253, a determination is made as to whether the old full pixel hint 62a is "01". If it is, then as indicated at block 254, z's are built from the reference z 54 and the Δz 64 using the top and bottom z computation mechanisms 111, 113 (FIG. 6). As indicated at block 256, a determination is made as to whether all z's fail, i.e., whether all z's are less in value than the reference z, meaning that they are behind the reference z. If so, then the algorithm concludes.

If all z's do not fail, then a determination is made at block 257 as to whether all the z's pass in that they are all greater in z value than the reference z, i.e., they are all in front of the reference z on the display. If so, then as indicated at block 252, the color data 50 is updated.

If all z's do not pass, then as denoted at block 258, an inquiry is made as to whether the new z 109 corresponding with sub0 is in front of or behind (greater than or less than, respectively) the reference z 54. If the new z 109 is in front of the reference z 54, then as delineated at block 259, new Δz's are constructed based on the reference z, the new z, old z's, and flags 125, 127, which indicate if sub3-sub1 passed or failed the z compare. Next, as indicated at block 261, the color data 50 is updated with the control processor 102. In contrast, when it is determined that the new z 109 corresponding with sub0 is behind the reference z 54, then the reference values do not change and, as indicated at block 263, the display color 52 is set to equal the mix color determined by the color mix logic 201 (FIG. 7) and the hints 58 are set to equal "11010000" (sub3 hint="01") if the new sub3 passed the z compare, or alternatively, "11100000" (sub3 hint="10") if the new sub3 did not pass the z compare. At this point, the algorithm completes.

Referring back to block 253, if it is determined that the full pixel hint 62a is not equal to "01", then as denoted at block 264, a determination is made as to whether the full pixel hint 62a is equal to "10".

If so, then z's are built from the reference z and the Δz's using the coprocessor 104, as indicated at block 265. Afterward, a determination is made as to whether all z's pass at block 266. If so, then the color data 50 for the entire pixel 44 is updated by performing the functionality set forth in block 252. If not, then the algorithm performs the operations described previously in connection with block 259 et seq.

If the answer at block 264 is in the negative, then the z's are built, as indicated by block 267, and an inquiry is made as to whether all z's pass, as denoted at block 268. If so, then the algorithm commences with the operations set forth at block 252; otherwise, if not, then the algorithm commences with the operations set forth at block 258.

2. Mask Equals "0001"

When the mask 108 equals "0001", then new data corresponding with subsample sub0 is being processed by the antialiasing system 20. The algorithm for handling this scenario is set forth in FIG. 8B.

Figure 8B:
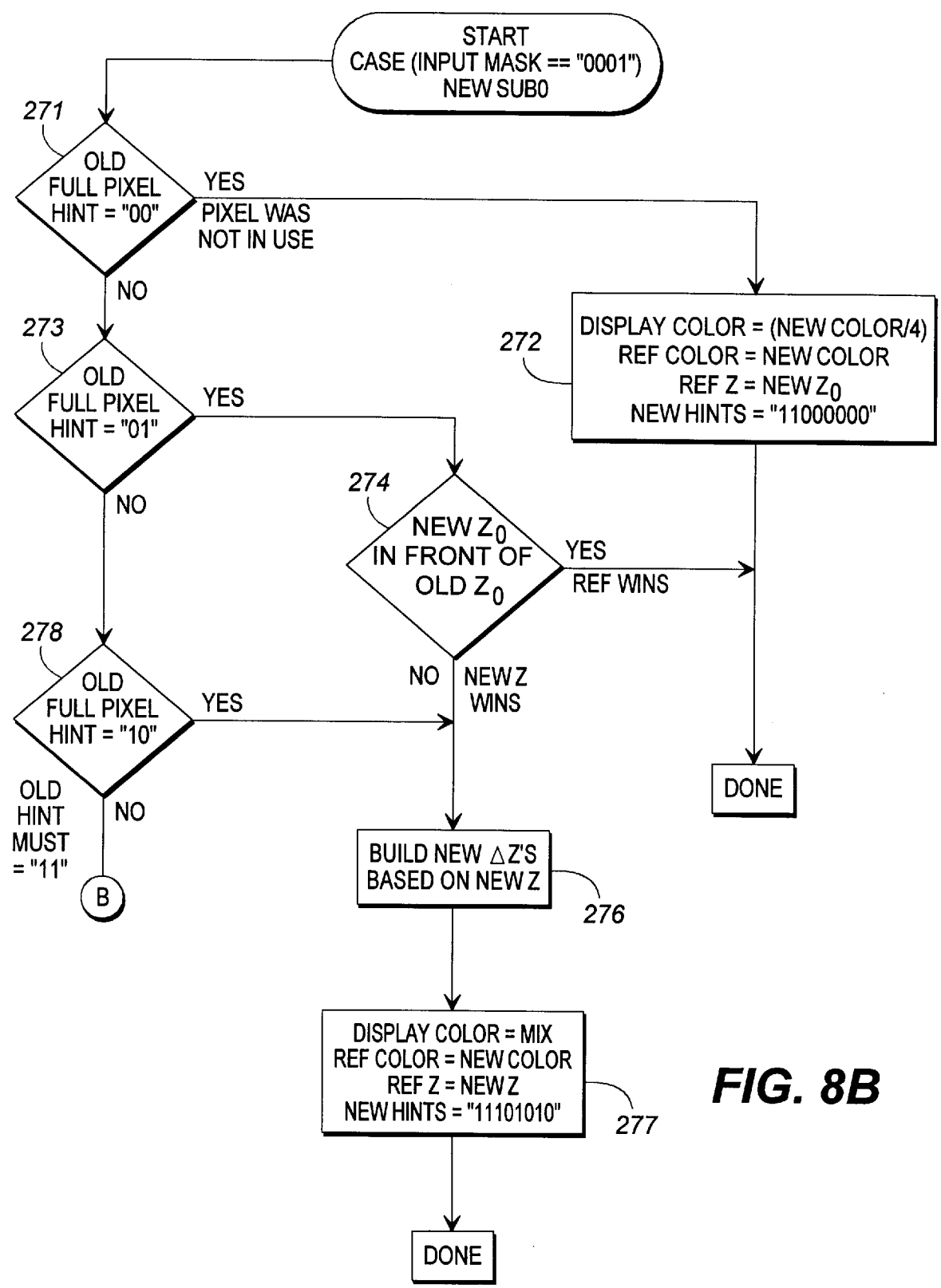

In this case, referring to FIG. 8B, a determination is made at block 271 as to whether the old full pixel hint 62a is "00". If so, then as indicated at block 272, the color data 50 is updated, and then the algorithm concludes.

If not, then as set forth at block 273, an inquiry is made as to whether the full pixel mix 62a is equal to "01". If so, then as indicated at block 274, the algorithm determines whether the new z 109 is in front of or behind the reference z 54. If the new z 109 is behind the reference z 54, the algorithm concludes. Otherwise, when the new z is in front of the reference z 54, then as denoted at block 276, new Δz's are constructed based on the new z 109 utilizing the coprocessor 104. Afterward, the color processor 102 updates the color data 50 in the frame buffer 34, pursuant to block 277 and then the algorithm terminates.

If at block 273, it is determined that the old full pixel hint 62a does not equal "01", then as set forth in block 278, a determination is made as to whether the full pixel hint 62a is equal to "10". If so, then the aforementioned operations as set forth in block 276 are performed. If not, then as indicated at block 263 (FIG. 8A), the display color 52 is set to the mix color and the hints 58 are updated.

3. Mask Equals "0010"

When the new data corresponds with sub1, then the mask 108 equals "0010". The algorithm for handling this case is set out in FIGS. 8C and 8D.

Figure 8C:
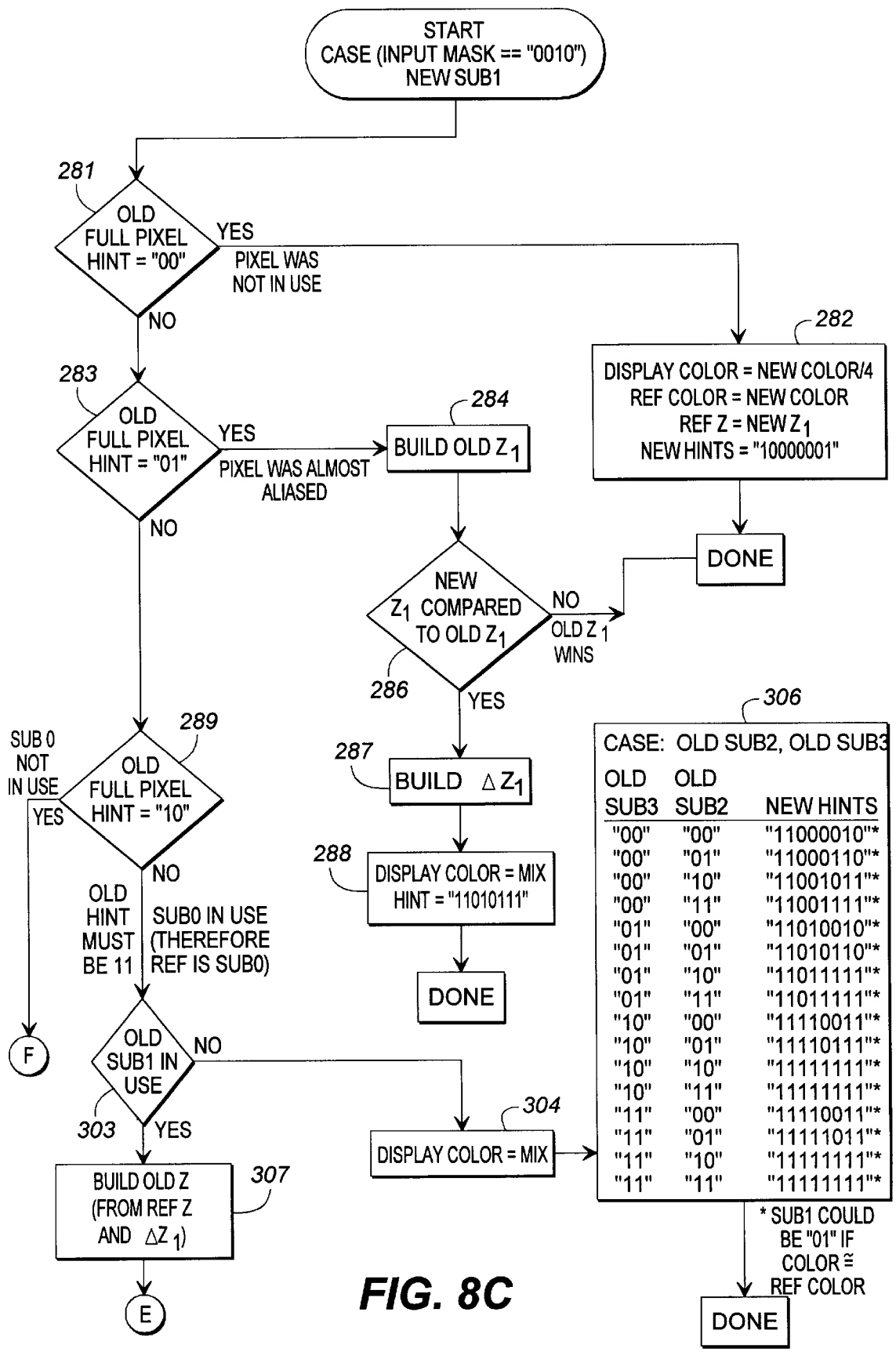
Figure 8D:
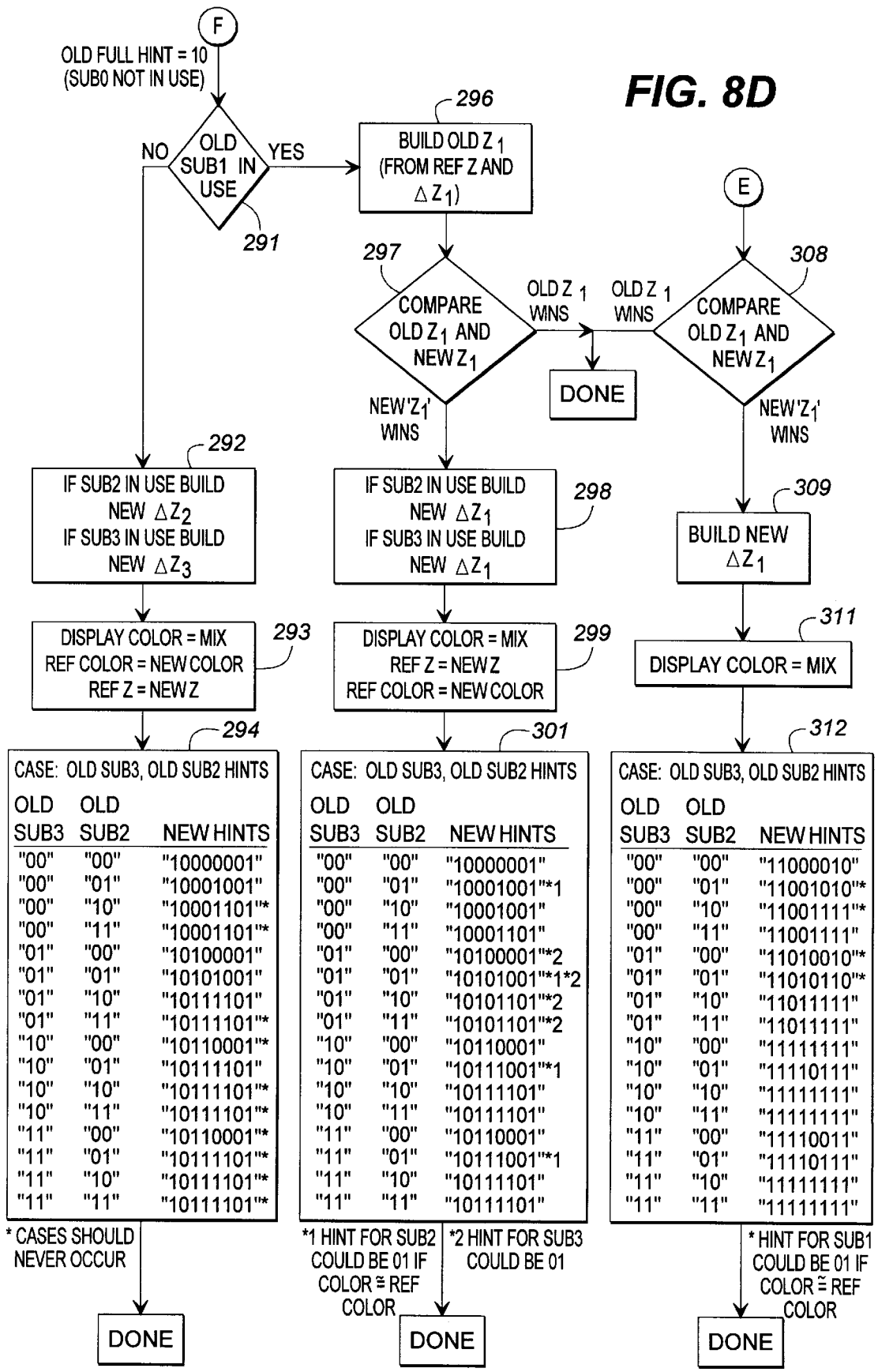

In this case, referring to FIG. 8C, at block 281, a determination is made as to whether the full pixel hint 62a is equal to "00". If so, then the pixel 44 was not previously in use and the color data 50 is updated with the new data, as indicated at block 282. Otherwise, when the full pixel hint 62a does not equal "00", then the operations at block 283 are performed.

As indicated by block 283, an inquiry is made as to whether the full pixel hint 62a is equal to "01". If so, then as indicated at block 284, the old z, is constructed utilizing the coprocessor 104.

Next, a determination is made as to whether the new z 109 is in front of the old z, as set forth in block 286. If it is not, then the color data 50 is not updated and the algorithm concludes. If so, a new Δz, is built using the coprocessor 104, as indicated at block 287. As set forth in block 288, the display color 52 is to equal the mix color as determined by the color mix logic 201. Finally, the algorithm concludes. If at block 283 it is determined that the old full pixel hint 62a does not equal "01", then pursuant to block 289, a determination is made as to whether the full pixel hint 62a is equal to "10". If so, then pursuant to block 291, a determination is made as to whether the old sub1 is in use. If not, then as indicated at block 292, a new $z_2$ is built if sub2 was in use and/or a new $\Delta z_3$ is built if sub3 was in use. Afterward, pursuant to block 293, the display color 52 is set to equal the mix color that is computed by the color mix logic 201. Finally, as indicated at block 294, the sub2 and sub3 hints 62c, 62b are redefined as the bit patterns set forth specifically in the block 294.

If at block 291, it is determined that the old sub1 is in use, then as indicated at block 296, the old z, is constructed from the reference z 54 and the Δz, utilizing the coprocessor 104. Afterward, pursuant to block 297, a determination is made as to whether the old $z_1$ is in front of the new z, 109. If so, then the algorithm terminates. If not, then the new z, 109 should be used to update the color data 50 and in accordance with block 298, a new $\Delta z_2$ is built if the sub2 was in use, and/or a new $\Delta z_3$ is built if sub3 was in use. Next, as indicated at block 299, the display color 52 is set to equal the mix color as computed by the color mix logic 201, the reference z 54 is set to equal the new z 109, and the reference color 56 is set to equal the new color 107. Finally, the sub2 and sub3 hints 62c, 62b are redefined to the bit patters set forth in block 301.

If at block 289, it was determined that the full pixel hint 62a was not equal to "10", then the full pixel hint 62a must be equal to "11". Next, as indicated at block 303, a determination is made as to whether the old sub1 is in use. If not, then pursuant to block 304, the display color 52 is set to the mix color determined by the color mix logic 201 and the sub3 and sub2 hints 62b, 62c are redefined as the bit patterns set forth in block 306.

If at block 303, it is determined that the old sub1 is in use, then pursuant to block 307, the old $z_1$ is constructed from the reference z 54 and the $\Delta z_1$ 64 utilizing the coprocessor 104. Further, at block 308, a determination is made as whether the old $z_1$ is in front of the new $z_1$ 109. If so, then the algorithm concludes. If not, then in accordance with block 309, a new $\Delta z_1$ is built utilizing the coprocessor 104. At block 311, the display color 52 is set to the mix color generated in the color mix logic 201. Finally, pursuant to block 312, the sub3 and sub2 hints 62b, 62c are redefined to the bit patterns specifically set forth in block 311.

4. Mask Equals "0100"

When the new data corresponds with sub2, then the mask equals "0100". The algorithm for handling this case is set out in FIGS. 8E through 8F.

Figure 8E:
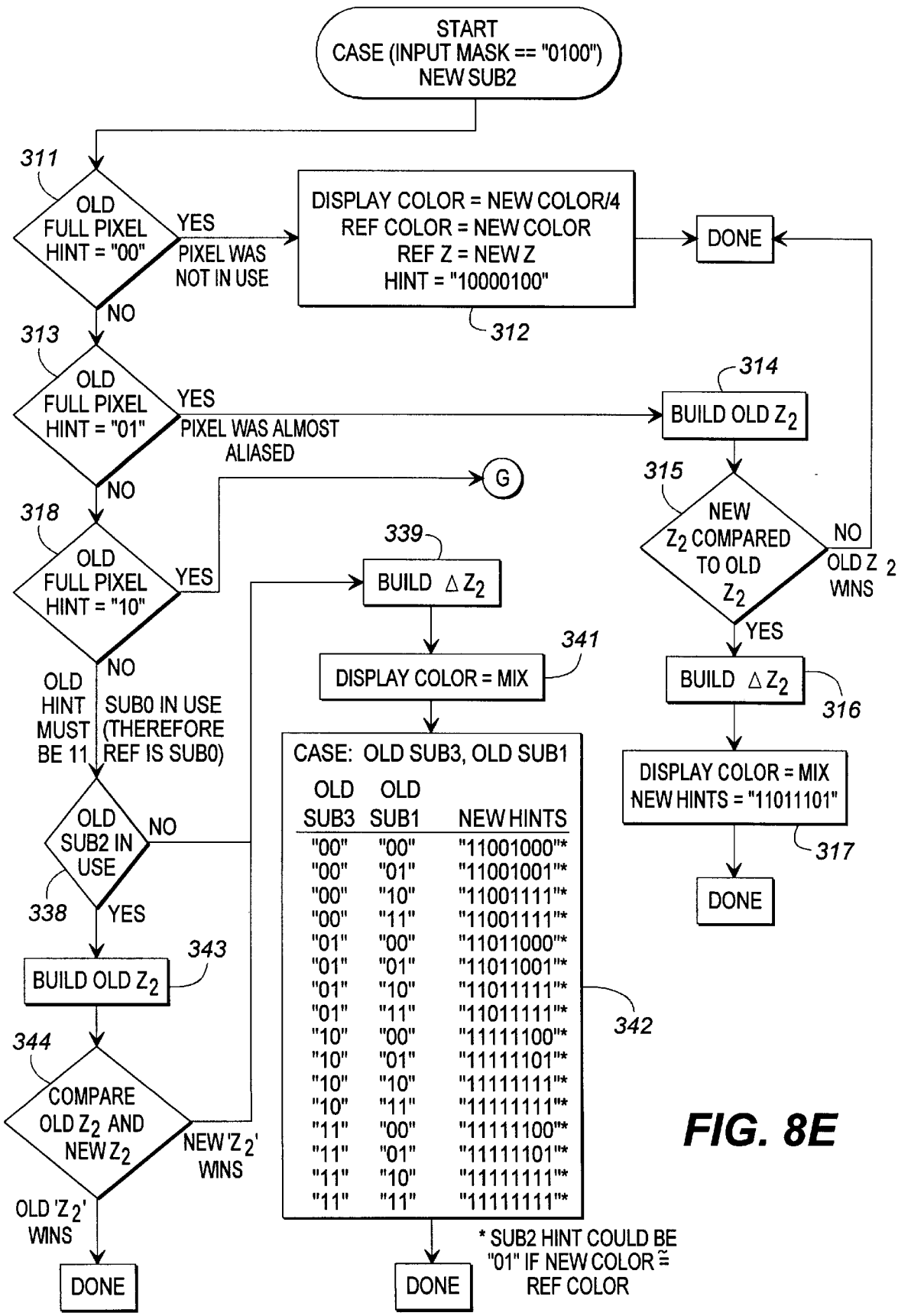
Figure 8F:
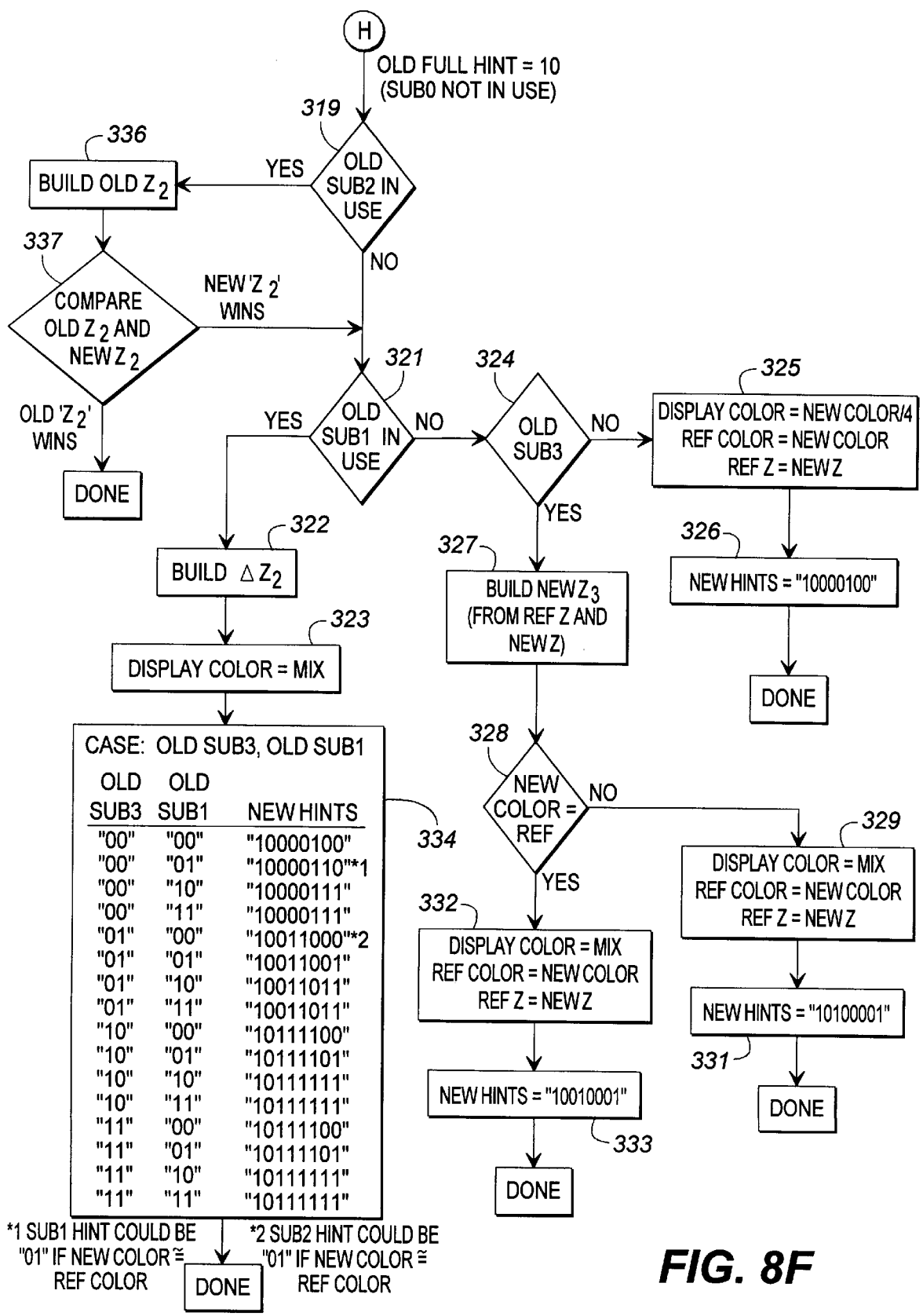

In this case, referring to FIG. 8E, at block 311, a determination is made as to whether the full pixel hint 62a is equal to "00". If so, then the pixel 44 was not previously in use and the color data 50 is updated with the new data, as indicated at block 312. Otherwise, when the full pixel hint 62a does not equal "00", then the operations at block 313 are performed.

As indicated by block 313, an inquiry is made as to whether the full pixel hint 62a is equal to "01". If so, then all four subsamples 46 within the pixel 44 were already in use, and as indicated at block 314, the old $z_2$ is constructed utilizing the coprocessor 104.

Next, a determination is made as to whether the new z 109 is in front of the old $z_2$, as set forth in block 315. If it is not, then the color data 50 is not updated and the algorithm concludes. If so, a new $\Delta z_2$ is built using the coprocessor 104, as indicated at block 316. As set forth in block 317, the display color 52 is set to equal the mix color as determined by the color mix logic 201. Finally, the algorithm concludes.

If at block 313 it is determined that the old full pixel hint 62a does not equal "01", then pursuant to block 318, a determination is made as to whether the full pixel hint 62a is equal to "10". If so, then sub0 is not in use and pursuant to block 319, a determination is made as to whether the old sub1 is in use. If not, then as indicated at block 321, a determination is made as to whether the old sub1 is in use.

If the answer at block 321 is in the positive, then, as indicated at block 322 a new $\Delta z_2$ is built. Moreover, the display color is set to the mix color, as indicated at block 323, and the hints 58 are set based on the translation indicated in block 334.

If the answer at block 321 is in the negative, then a further determination is made as to whether the old sub3 exists.

If not, then the display color is set to equal the new color divided by four, the reference color is set to the new color, and the reference z is set to the new z, all of which are indicated at block 325. Moreover, the hint 62a is set to equal "10000100." Finally, the algorithm concludes.

If at block 324, it is determined that the old sub3 does exist, then the reference is moved from sub3 to sub2. This is similar to the path taken at block 291 (==no) when the reference is moved to sub1. In this regard, a new $\Delta z_3$ is built from the reference z and the new z, as indicated at block 327. Further, a determination is made as to whether the new color is approximately equal to the reference color, as indicated at block 328, utilizing the color threshold compare logic 209 (FIG. 7).

If not, then the display color is set to the mix color, the reference color is set to equal the new color, and the reference z is set to the new z, all of which are indicated at block 329. Further, the hint 62a is set to equal "10100001," as depicted at block 331. Finally, the algorithm concludes.

If at block 328 it is determined that the new color is approximately equal to the reference color, then pursuant to block 332, the display color is set to the mix color, the reference color is set to the new color, and the reference z is set to the new z. Further, the hint 62a is set to equal "10010001, at block 333. Finally, the algorithm concludes.

If at block 319, it is determined that the old sub2 is in use, then the old $z_2$ is built, as indicated at block 336. Next, the old $z_2$ and the new $z_2$ are compared, pursuant to block 337. If the new $z_2$ wins, then the operations commencing at block 321 are performed. If the old $z_2$ wins, then the algorithm concludes.

If at block 318, it is determined that the pixel hint 62a does not equal "10," then a further determination is made as to whether the old sub2 is in use, as delineated at block 338.

If not, then the operations commencing at block 339 are performed. In this regard, the $\Delta z_2$ is built, as indicated at block 339. Further, the display color is set to the mix color, as indicated at block 341. Moreover, the sub3 and sub1 hints 62b, 62d are redefined as set forth in block 342. Finally, the algorithm terminates.

If at block 338, it is determined that the old sub2 is in use, then the old $z_2$ is built, as delineated at blocked 343. Further, the old $z_2$ and the new $z_2$ are compared at block 344. If the new $z_2$ wins, then the operations commencing at block 339 are performed. Otherwise, the algorithm concludes.

5. Mask Equals "1000"

When the new data corresponds with sub3, then the mask equals "1000". The algorithm for handling this case is set out in FIGS. 8G and 8H.

Figure 8G:
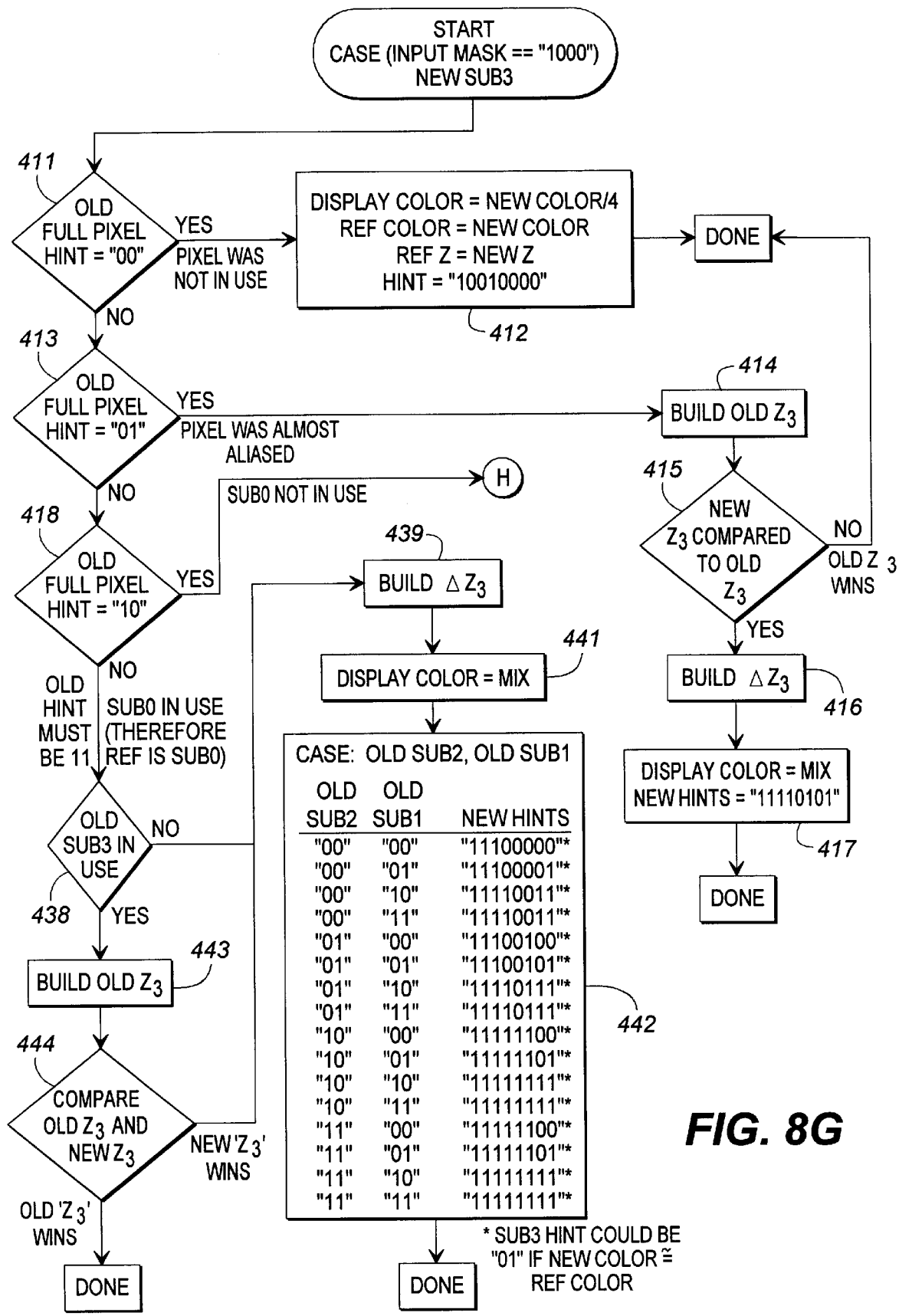
Figure 8H:
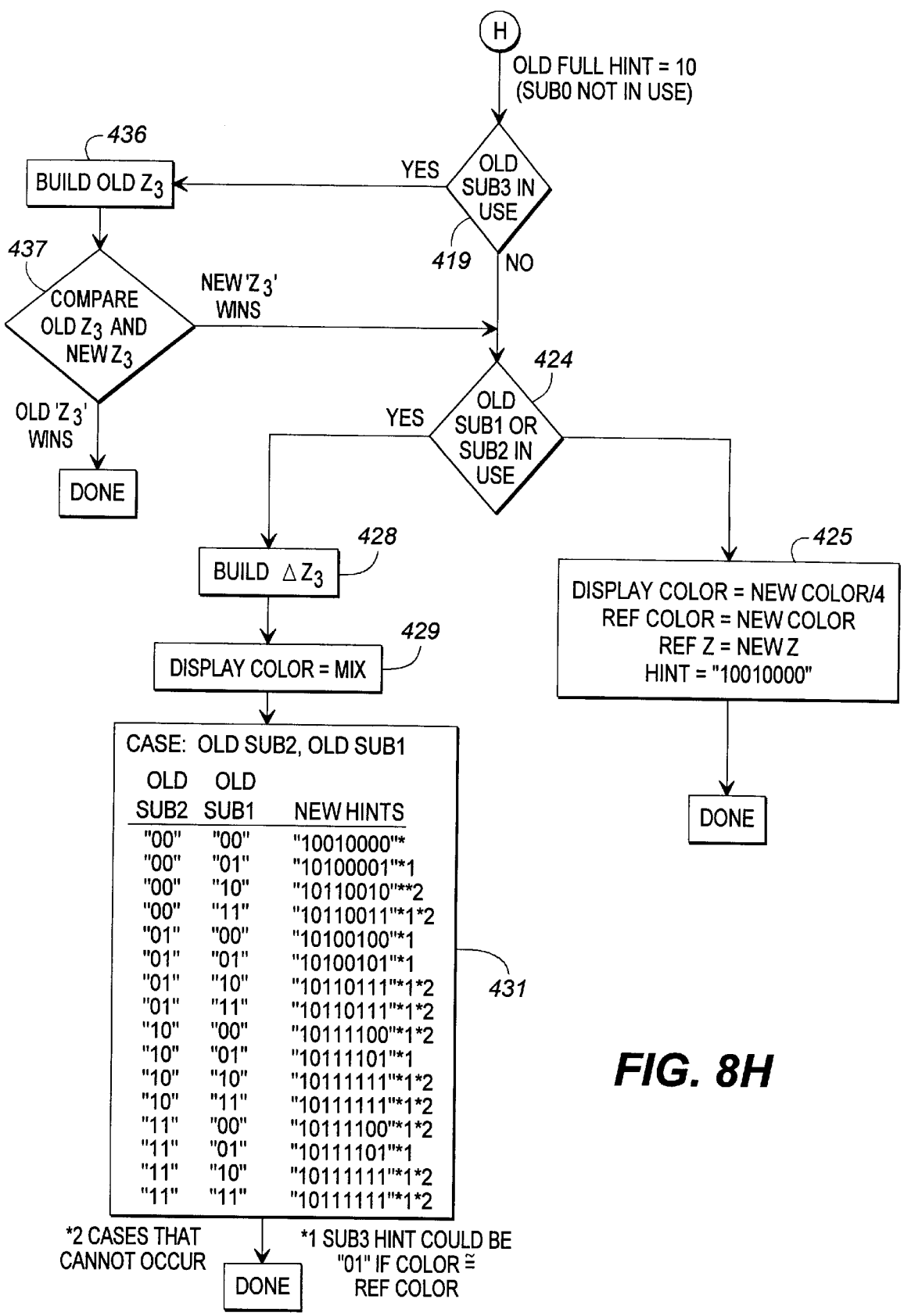

In this case, referring to FIG. 8G, at block 411, a determination is made as to whether the full pixel hint 62a is equal to "00". If so, then the pixel 44 was not previously in use and the color data 50 is updated with the new data, as indicated at block 412, and the hints 58 are set to "10010000". Otherwise, when the full pixel hint 62a does not equal "00", then the operations at block 413 are performed.

As indicated by block 413, an inquiry is made as to whether the full pixel hint 62a is equal to "01". If so, then the pixel 44 had all of sub3-sub0 in use, and as indicated at block 414, the old $z_3$ is constructed utilizing the coprocessor 104.

Next, a determination is made as to whether the new z 109 is in front of the old $z_3$, as set forth in block 415. If it is not, then the color data 50 is not updated and the algorithm concludes. If so, a new $\Delta z_3$ is built using the coprocessor 104, as indicated at block 416. As set forth in block 417, the display color 52 is set to equal the mix color as determined by the color mix logic 201, and the hints 58 are set at "11110101". Finally, the algorithm concludes.

If at block 413 it is determined that the old full pixel hint 62a does not equal "01", then pursuant to block 418, a determination is made as to whether the full pixel hint 62a is equal to "10". If so, then sub0 is not in use and pursuant to block 419, a determination is made as to whether the old sub3 is in use. If not, then as indicated at block 424, a determination is made as to whether the old sub2 or old sub1 is in use.

If the answer at block 424 is in the positive, then either sub1 or sub2 is already in use as the reference, and as indicated at block 428, a new $\Delta z_3$ is built. Moreover, the display color is set to the mix color, as indicated at block 429, and the sub2 and sub1 hints 62c, 62d are redefined as set forth in block 431.

If the answer at block 424 is in the negative, then sub3 is the only subsample 46 in use so it is used as the reference. Accordingly, the display color is set to equal the new color divided by four, the reference color is set to the new color, and the reference z is set to the new z, all of which are indicated at block 425. Moreover, the hint 62a is set to equal "10010000." Finally, the algorithm concludes.

If at block 419, it is determined that the old sub3 is in use, then the old $z_3$ is built, as indicated at block 436. Next, the old $z_3$ and the new $z_3$ are compared, pursuant to block 437. If the new $z_3$ wins, then the operations commencing at block 424 are performed. If the old $z_3$ wins, then the algorithm concludes.

If at block 418, it is determined that the pixel hint 62a does not equal "10," then the old sub3 hint 62b must equal "11", and thus sub0 is the reference. Next, a further determination is made as to whether the old sub3 is in use, as delineated at block 438.

If not, then the operations commencing at block 439 are performed. In this regard, the $\Delta z_3$ is built, as indicated at block 439. Further, the display color is set to the mix color, as indicated at block 441. Moreover, the sub2 and sub1 hints 62c, 62d are redefined as set forth in block 442. Finally, the algorithm terminates.

If at block 438, it is determined that the old sub3 is in use, then the old $z_3$ is built, as delineated at block 443. Further, the old $z_3$ and the new $z_3$ are compared at block 444. If the new $z_3$ wins, then the operations commencing at block 439 are performed. Otherwise, the algorithm concludes.

2. Second Embodiment of the Antialiasing System

FIG. 5B shows a second embodiment of the antialiasing system and is generally denoted by reference numeral 20". The primary difference between the first and second embodiments is that the second embodiment includes two additional coprocessors 104', 104", which are constructed just as coprocessor 104. In the second embodiment, the subsamples sub3-sub0 can be processed in parallel, leading to increased speed as the expense of complexity and logic. In this embodiment, the coprocessors 104, 104', 104" are dedicated to processing sub3-sub1, respectively, while the control processor 102 processes sub0 as well as controls the entire system 20"

F. Operation

For purposes of simplicity, the operation of the antialiasing system 20 will now be described in connection with the first embodiment, or antialiasing system 20' (FIG. 5A).

Further, the first embodiment of the color data 50 (FIG. 3) will be assumed.

When the new mask 108 (FIG. 5A) is sent to the color control processor 102 (FIG. 5A), it is restricted to having either all four bits set to a logical 1 or only a single bit set to 1. This means that either the entire pixel 44 is processed or a single subsample 46.

As an example, the discussion will step through the processing of a triangle with reference to FIG. 2. In this example, it will be assumed that the triangle will be processed from the top downwardly using the edge stepper 88 (FIG. 4) and then the spans are processed from right to left using the span stepper 93 (FIG. 4). It is further assumed that the triangle is the first drawn, thus the frame buffer 34 (FIG. 4) is clear. Note that the hints 58 that are stored in the frame buffer 34 are all set to zeros at start.

The first rendered subsample 46 that the steppers 88, 93 (FIG. 4) encounter is sub2 in the pixel 44 at x,y coordinates (2,0). However, sub2 is not sent to the memory control 97 (FIG. 4), until the edge stepper 88 advances to the next row of pixels. The collection logic 91 (FIG. 4) between the edge stepper 88 and the span stepper 93 collects the subsamples 46. The collection logic 91 examines the span data, detecting any cases where all four subsamples 46 of a pixel 44 are covered by a single triangle.

The edge stepper 88 now steps to the scan line where sub3 of the pixel 44 at coordinates (2,0) is found. At this point, the collection logic 91 will determine that a row of pixels 44 has been processed. It will also see that there are no cases where a pixel 44 has all four subsamples 46 covered. The collection logic 91 will then send the edge data for the y address location containing sub2. This data goes to the span stepper 93, where it will break the scan line down into individual subsamples. In this example, the span stepper 93 produces only one subsample 46. (Note that the number of subsamples 46 produced for any scan line, by the span stepper 93, is based on the size of the triangle. In some large triangles, there may be over 1000 subsamples 46 produced from a single scan line.) The data for this subsample 46 will be sent from the span stepper 93 to the memory control 97. This data includes the color value and z at the location of sub2. In addition, a mask 108 of binary 0100 is sent. This mask 108 has bits that mark which subsample is valid. These are ordered from sub3 to sub0.

The color control processor 102 (FIG. 5A) will examine the color 107, the mask 108, and the new z value 109 and will read the hints 58 stored in frame buffer 34. Because it is assumed that the frame buffer 34 was cleared, the hints 58 will all exhibit zeroes. Once the control processor 102 determines that the hints 58 are all zeroes, it will know that it does not need to read the other data in FIG. 3, including the display color 52, the reference color 56, and the reference z 54, and Δz's. In this case, the color control processor 102 knows that the pixel 44 at coordinates (2,0) (FIG. 2) has not been used yet, in which case, in FIG. 8, operations transfer from block 311 to block 312.

Processing for this new sub2 includes building a new hint 62c (FIG. 3). In this example, the full pixel hint 62c will be set to "10." This is because after this sub2, the pixel 44 at coordinates (2,0) will hold valid data. The sub3 and sub1 hints 62b, 62d (FIG. 3) will be set to "00," because these subsamples 46 are not in use as of the time of processing the first subsample 46. The sub2 hint 62c will be set to "10", because sub2 is in use and the initial reference data is stored based on sub2. Note that because sub2 is the only subsample 46 in use as this data is being processed, it is reasonable to use sub2 as the reference color 56 (FIG. 3).

The results of processing sub2 would be as follows. The hints 58 will be set to a bit pattern of "10000100." Because there is only a single subsample in use, the Δz values will be left as 0's. The reference z 54 and the reference color 56 would be the new color 107 and new z 109 sent from the span stepper 93. The display color 52 (FIG. 3) would be the reference color 56 divided by 4, as there are four subsamples 46 in each pixel 44. The foregoing computation is performed in the color logic mix 201 (FIG. 7). The color logic mix 201 takes the sum of the color value of each of the subsamples 46 and divides each by four. The reason is that there are four subsamples 46 per pixel 44 and, therefore, each subsample 46 contributes ¼ of the total color value. In this example, sub3, sub1, and sub0 are all presently 0. Thus, the display color 52 is the color value equal to sub2/4.

The span stepper 93 now processes the data for sub3. As in the last case, the span stepper 93 generates a single subsample 46. The span stepper 93 sends the new color 107 and the new z 109 at sub3 along with a mask 108 of "1000" to the color control processor 102. This mask 108 informs the state machine 203 that sub3 is now being processed. Note that the system 20' will again be working at the same pixel 44 at coordinates (2,0) (FIG. 2).

When the state machine 203 receives this new data, it will review the hints 58 stored in the frame buffer 34 (FIG. 4). In this case, the state machine 203 will read 10000100" that was written based upon the last subsample 46. This information advises the state machine 203 that only sub2 is currently in use for this pixel 44. In FIG. 8, the aforementioned operations are accomplished by blocks 411–413, 418–419, 424, and 428–429.

The reference z 54 and the new z 109 are sent to the coprocessor 104 (FIG. 6) from the frame buffer 34. In the coprocessor 104, a Δz will be created for sub3. Note that up to this time sub3 has not been used, so the compare logic 112 will be informed that the new Δz can be used for sub3. The compare logic 112 is important if at a later time a new triangle were to be drawn on top of or behind the triangle that is currently being processed. In most cases, a triangle behind the present one would lose the compare and thus suppress the update of the frame buffer 44. On the other hand, a new triangle in front of the present one would win the compare and force an update of the frame buffer 34.

The reference color 56 and the reference z 54 would not change. The reason for this is that in the preferred embodiment, the subsample 46 that is furthest up, or greater, in the y direction is the reference. With this choice, whenever sub0 is in use, it is the reference. This convention was chosen because when the upstream logic detects a case where a triangle covers all four subsamples 46 of a pixel 44, the span stepper 93 generates the data for sub0. Other embodiments can use one of the other subsamples 46 as the reference, most notably sub1 or sub2.

An interesting part of processing sub3 concerns the color. In a typical triangle, the color between two subsamples 46 does not vary by much. This means there are two cases that should be handled. The first is where the color is very close to the reference color 56. This case occurs often when processing a single triangle, such as in this example. The second case is where the colors are not very close. This second case is most likely to arise when two disjoint surfaces cross within a single pixel 44.

The way in which the color is checked involves comparing the new color 107 generated by sub3 with the reference color 56. If the two are within a predefined threshold, the first case is assumed. Typically, the threshold is set to about 4, when the color values range from decimal 0 to 255 (8 bit binary). Note that the compare is performed by the color threshold compare logic 209 (FIG. 7) on all three components of color, i.e., red, green, and blue. The compare should pass all three colors in order to be considered close.

For this example, it will be assumed that the color value at sub3 is close to the reference color 56. Note that the reference color 56 is the color from sub2 that was saved when processing sub2. In this case, the display color 52 will be updated to the sum of the reference color 56 and the color value for sub3 divided by 4. Furthermore, the sub3 hint 62*b* (FIG. 3) needs to be updated. The first two bits of the full pixel hint 62*a* remain the same at "10." This means there is some valid subsamples 46, but not sub0. The sub3 hint 62*b* is set to "01" by the state machine 203, because it is assumed that it matches the reference color 56. The sub2 hint 62*c* remains as "01." The sub1 hint 62*d* remains "00." The entire hints 58 will be the eight bit pattern "100100100." The $\Delta z_3$ is written to the frame buffer 34 by the state machine 203.

If the threshold compare for the color were to fail, the only difference is that the sub3 hint 62*b* would be set to "10," instead of "01." This difference would be important if another triangle were to be drawn into the same pixel 44 at coordinates (2,0) (FIG. 2). In this case, it is assumed that there is a new sub4 or sub1 because sub2 and sub3 are in use. Moreover, where sub3 matches the reference color 56, a future display color 52 could be created by computing two times the reference color 56 plus this future color value in order to derive a result and then dividing the result by four. If, on the other hand, the sub3 hint 62*b* indicates that the sub3 color is a mix with the reference color 56, then the sub3 color (the mix color) can be recovered by using simple algebra, particularly the following equation:

$$\begin{aligned}\text{display color} = \\ (((\text{number of subsample that are the same color as reference}) * \\ \text{reference color}) + \\ ((\text{number of subsamples that are mix}) * \text{mix color}))/4\end{aligned}$$

In this equation, the reference color 56 and the display color 52 are stored in the frame buffer 34. In addition, the hints 58 indicate how many subsamples 46 are the same as the reference color 56 and how many are a mix. Thus, at the time a future triangle causes the pixel 44 to be updated, the mix color is the only unknown in the above equation. Therefore, simple algebra can be used to recover the mix color, even though it has not been saved. The foregoing equation and functionality are implemented by the demix equation mechanism 221 (FIG. 7). This feature saves a large amount of frame memory and reduces the number of cycles it would take to access that memory. The display color 52 for this future pixel 44 would then be the reference color 56 plus the recovered mix color plus the new color of the future subsample 46, all divided by four.

Continuing with the example, the edge stepper 88 steps four subscan lines for the pixel at y=1. These will be collected by the collection logic 91 and examined before being sent to the span stepper 93. At this point, the edge stepper 88 detects that some pixels 44 have all four subsamples 46 covered by the same triangle. The span stepper 93 is told to generate all the pixels 44 where the four subsamples 46 are covered. In this example, this is a single pixel 44 at x,y coordinates (2,1) (FIG. 2), but other triangles could produce many of these types of pixels. In this example, the memory control 97 (FIG. 4) would receive the new color value and new z for sub0 with a mask of "1111" for the pixel at x,y coordinates (2,1). The aforementioned operations are accomplished at blocks 251–252 in FIG. 8.

Upon receiving the data from the span stepper 93, the memory control 97 feeds the hints 58 stored for the pixel at x,y coordinates (2,1) to the frame buffer 34. Because it is assumed that the frame buffer 34 was cleared before drawing this triangle, the hints 58 will be "00000000." This pixel 44 would result in the frame buffer 34 being updated as follows: (a) The display color 52 would be the new color 107 sent from the span stepper 93. (b) The reference color 56 would be the new color 107 sent from the span stepper 93. (c) The reference z 54 would be the new z 109 sent from the span stepper 93. (d) The $\Delta z$'s would be built up using the dz/dx 106*a*, the dz/dy 106*b*, and the reference z 54. Note that the dz/dx 106*a* and the dz/dy 106*b* is sent with the plane equation data on a per triangle basis. (e) The hints 58 are set such that the full pixel hint 62*a* is "01." This is the hint that means the pixel 44 has all four subsamples sub3-sub0 in use. The hints 62*b*, 62*c*, 62*d* for sub3, sub2, and sub1, respectively, will all be set to "01." This means that the subsamples 46 have the same color as the reference color 56. Thus, the hints 58 would be stored as "01010101."

Also note that it is assumed in this example that a single coprocessor 104 is utilized. In this case, the $\Delta z$'s could require up to three cycles to be computed by the coprocessor 104, one each cycle. Of course, in the case where there are three coprocessors 104, 104', 104" as in the second embodiment of FIG. 5B, then this work is performed in a single cycle.

The two subsamples 46 at the pixel 44 with x,y coordinates (1,1) (FIG. 2) would be processed the same as the first pixel 44 at x,y coordinates (2,0) in this example. This is because both pixels 44 have the same valid subsamples 46, particularly, sub3 and sub2.

After processing the data for scan line y=1, the edge stepper 88 moves to the bottom row of pixels 44. The triangle would end after stepping to subscan line 2. A signal would be sent from the edge stepper 88 to the collection logic 91 to flag the end of the triangle condition. Because there are no rendered subsamples 46 at subscan line 3, the collection logic 91 knows that along the row y=2 of pixels 44, there can be no pixels 44 where all four subsamples 46 are covered.

The collection logic 91 begins the processing by sending the span stepper 93 the data for subscan line 0. In this example, the span stepper 93 produces a single subsample 46 for the pixel 44 at coordinates (2,2). The color control processor 102 within the antialiasing system 20' receives the new color 107, the new z 109, and the mask 108 of "0001" from the span stepper 93. (See FIG. 8, blocks 271–272.) When this subsample 46 is processed by the color control processor 102, the control processor 102 will first read the hints 58 stored in the frame buffer 34. The hints 58 will be "00000000" so that the logic will update the frame buffer 34 as follows: (a) The display color 52 will be set to the new color 107 received from the span stepper 93 divided by four. (b) The reference color 56 is set to the new color 107 sent by the span stepper 93. (c) The reference z 54 is set to the new z 109 sent from the span stepper 93. (d) The $\Delta z$'s would not be updated, because in this case, only sub0 is being worked on. (e) The hints 58 would be set so that the full pixel hint 62*a* (FIG. 3) is set at "11." This means that sub0 is valid, but that not all of the subsamples 46 have something. In this case, sub3, sub2, and sub1 would be empty. Thus, the hints 58 would be "11000000."

When the span stepper 93 moves on to subscan line 1, it will produce a single subsample at the pixel 44 with x,y coordinates (3,2). This subsample 46 will be processed similar to the subsamples 46 in the first pixel 44 at coordinates (2,0). (See FIG. 8, blocks 281–282.) The only difference is that the mask 108 that is sent from the span stepper 93 will be "0010." This mask 108 indicates that sub1 is being processed. In addition, the hints 58 will be modified to update the sub1 hint 62*d*.

In the aforementioned example, a single coprocessor 104 (FIG. 5A), as opposed to three coprocessors 104 (FIG. 5B) was assumed for simplicity. The primary difference is that if the extra processors 104 are there, then the subsamples 46 can be processed in parallel. Referring back to the pixel 44 at x,y coordinates (2,0), the mask 108 would be set to "1100" to indicate that both sub3 and sub2 are to be processed. The fundamental problem with processing subsamples 46 in parallel is that more complicated cases can arise. For example, a mask 108 that indicates that there are three subsamples 46 to be processed may find that two of the three pass the z compare and require a frame buffer update. In the same pixel 44, one of the subsamples 46 may fail the z compare. Furthermore, it is possible that the same pixel 44 may have colors that match the reference color 56 and some that do not. This extra complexity results in more complex control logic.

Note that in the claims set forth hereafter in the Claims section of this document, the structures, materials, acts, and equivalents of all "means" elements and "logic" elements are intended to include any structures, materials, or acts for performing the functions specified in connection with said elements.

APPENDIX

This appendix includes simulation code pertaining to the antialiasing system 20, color data 50, and associated methodologies. The simulation code was used to test the extent to which the antialiasing system 20 of the invention reduces the storage and I/O cycles needed to antialias an image.

Note that this simulation code is a test bed only. As such, full support for the various z rules, stencil buffer, etc., is not included in the code. In addition, the code does not receive pixels 44 one at a time. Rather, this code receives data for an entire triangle at a time. However, the "for" loops at the beginning sequence through the triangle one pixel at a time. Note also that this test code simulates the case where any number of bits may be set in the mask that is processed per pixel. In other words, this code handles the case of 1, 2, 3 or 4 subsamples being valid in a single pixel at a time. The hardware may be designed to handle only the cases of: mask a single bit or all 4 bits set at a single time.

Based on the following simulation rode, it was found that a 6 to 7 times price performance improvement over traditional 4 sample methods of antialiasing can be realized using the antialiasing system 20 and color data 50 of the invention.

```
*************************************************************************
Smart_algorithm_for_antialiasing()
{
```

```
int    red;              /* Red at pixel */
int    green;            /* Green at pixel */
int    blue;             /* Blue at pixel */
int    red_0;            /* Red at sub-pixel 0 */
int    green_0;          /* Green at sub-pixel 0 */
int    blue_0;           /* Blue at sub-pixel 0 */
int    red_1;            /* Red at sub-pixel 1 */
int    green_1;          /* Green at sub-pixel 1 */
int    blue_1;           /* Blue at sub-pixel 1 */
int    red_2;            /* Red at sub-pixel 2 */
int    green_2;          /* Green at sub-pixel 2 */
int    blue_2;           /* Blue at sub-pixel 2 */
int    red_3;            /* Red at sub-pixel 3 */
int    green_3;          /* Green at sub-pixel 3 */
int    blue_3;           /* Blue at sub-pixel 3 */
int    x,y;
int    sub_pix_0;
int    sub_pix_1;
int    sub_pix_2;
int    sub_pix_3;
int    sub_pixels;
int    update_needed;
int    update_hint;
int    update_0;
int    update_1;
int    update_2;
int    update_3;
int    update_1_z;
int    update_2_z;
int    update_3_z;
int    reference_z;
int    old_z;
int    old_z_0;
int    old_z_1;
int    top_z_1;
int    old_z_2;
int    top_z_2;
int    old_z_3;
int    top_z_3;
int    new_z_0;
int    new_z_1;
int    new_z_2;
int    new_z_3;
int    int_lead;
int    int_msb;
int    old_covers_saved;
int    old_covers_lost;
int    temp_red;
int    temp_green;
int    temp_blue;
int    temp_red1;
int    temp_green1;
```

-48-

```
int    temp_blue1;
int    temp_red2;
int    temp_green2;
int    temp_blue2;
int    temp_red3;
int    temp_green3;
int    temp_blue3;
int    biggest_hint;
int    z_update_done;
int    z_from_0;
int    z_from_1;
int    z_from_2;
int    z_from_3;
int    max_lead;
int    good_old_red;
int    good_old_green;
int    good_old_blue;
int    r_hints;    /* for statistics */
int    r_z;        /* for statistics */
int    r_rgb;           /* for statistics */
int    r_fb;            /* for statistics */
int    w_hints;    /* for statistics */
int    w_rgb;           /* for statistics */
int    w_z;        /* for statistics */

/***************** HINT FIELD *****************/ int    owns_it;   /* from hint field.
                     If 1 then pixel is covered by one surface */
int    in_use_0;  /* from hint field.
                     If 1 then sub_pixel 0 is in use */
int    hint_1;         /* from hint field. A two bit field where:
                     00 = sub_pixel 1 Not in use.
                     01 = sub_pixel 1 is same as sub_pixel 0.
                     10 = displayed pixel is mix of 0 & 1
                     11 = things are falling apart. */
int    hint_2;         /* from hint field. A two bit field where:
                     00 = sub_pixel 1 Not in use.
                     01 = sub_pixel 1 is same as sub_pixel 0.
                     10 = displayed pixel is mix of 0 & 1
                     11 = things are falling apart. */
int    hint_3;         /* from hint field. A two bit field where:
                     00 = sub_pixel 3 Not in use.
                     01 = sub_pixel 3 is same as sub_pixel 0.
                     10 = displayed pixel is mix of 0 & 3
                     11 = things are falling apart. */
int    lead_1;         /* from hint field. A five bit field where
                     the bits count the leading 1's or 0's */
int    msb_1;          /* from hint field. A three bit field where
                     3 bits of Z value following lead count */
int    lead_2;         /* from hint field. A five bit field where
                     the bits count the leading 1's or 0's */
```

-49-

```
        int    msb_2;         /* from hint field. a three bit field where:
                                 3 bits of Z value following lead count */
        int    lead_3;        /* from hint field. A five bit field where
                                 the bits count the leading 1's or 0's */
        int    msb_3;         /* from hint field. a three bit field where:
                                 3 bits of Z value following lead count */ for(y = (tri_y_min -1); y < (tri_y_max + 1); y++) {
       for(x = (tri_x_min -1); x < (tri_x_max + 1); x++) {
         if(((x > (X_smallest + X_center)) &&
             (x < (X_largest + X_center))) &&
            ((y > (Y_smallest + Y_center)) &&
             (y < (Y_largest + Y_center)))) {    /* pixel in range */
           if(z_buf_T_in_use[y][x] != 0) { /* update pixel */

/************* perform some house keeping  *************/ r_hints = 0;
            r_z = 0;
            r_rgb = 0;
            r_fb = 0;
            w_hints = 0;
            w_rgb = 0;
            w_z = 0;
            hints.all = z_buf_hints[y][x].all; /* get hint field */
            owns_it = hints.bits.owns_it;
            in_use_0 = hints.bits.in_use_0;
            hint_1 = hints.bits.hint_1;
            hint_2 = hints.bits.hint_2;
            hint_3 = hints.bits.hint_3;
            lead_1 = hints.bits.lead_1;
            msb_1 = hints.bits.msb_1;
            lead_2 = hints.bits.lead_2;
            msb_2 = hints.bits.msb_2;
            lead_3 = hints.bits.lead_3;
            msb_3 = hints.bits.msb_3;

biggest_hint = hint_1;
            if(hint_2 > biggest_hint) biggest_hint = hint_2;
            if(hint_3 > biggest_hint) biggest_hint = hint_3;

sub_pix_0 = 0;        /* clear it */
         sub_pix_1 = 0;        /* clear it */
         sub_pix_2 = 0;        /* clear it */
         sub_pix_3 = 0;        /* clear it */
         update_needed = 0;    /* clear it */
         update_hint = 0;      /* clear it */
         update_0 = 0;         /* clear it */
         update_1 = 0;         /* clear it */
         update_2 = 0;         /* clear it */
         update_3 = 0;         /* clear it */
         update_1_z = 0;       /* clear it */
```

HP REF. 10950676-1

```
                                -50-
            update_2_z = 0;        /* clear it */
            update_3_z = 0;        /* clear it */
            red = 0;           /* clear it */
            green = 0;             /* clear it */
            blue = 0;              /* clear it */
              old_covers_saved = 0;  /* clear it */
              old_covers_lost = 0;   /* clear it */
            new_z_0 = 0;           /* clear it */
            new_z_1 = 0;           /* clear it */
            new_z_2 = 0;           /* clear it */
            new_z_3 = 0;           /* clear it */
              z_update_done = 0;       /* clear it */
              z_from_0 = 0;        /* clear it */
              z_from_1 = 0;        /* clear it */
              z_from_2 = 0;        /* clear it */
              z_from_3 = 0;        /* clear it */ if(in_use_0 == 1) z_from_0 = 1;
            if((hint_1 != 0) && (z_from_0 == 0))
            z_from_1 = 1;
            if((hint_2 != 0) && (z_from_0 == 0)&&(z_from_1 == 0))
            z_from_2 = 1;
if((hint_2!=0)&&(z_from_0==0)&&(z_from_1==0)&&(z_from_2==0))
            z_from_3 = 1;

old_z = stored_z_buf[y][x]; /* use to build hints*/
            temp_int = z_buf_T_in_use[y][x] & 0x01;

if((debug == 1) &&(x == x_of_interset) && (y == y_of_interset))
{
            fprintf(stderr,"%d z_from_3 _2 _1 _0   %d %d %d %d old =
%x\n", hint_1,z_from_3,z_from_2,z_from_1,z_from_0,old_z);
            } if(temp_int > 0) {             /* sub-pixel 0 valid */
              sub_pix_0 = 1;
              new_z_0 = z_buf_T_0[y][x];
              /* real HW has only one color sample/pixel, so
simulate:*/
              red_buf_T_1[y][x] = red_buf_T_0[y][x];
              grn_buf_T_1[y][x] = grn_buf_T_0[y][x];
              blu_buf_T_1[y][x] = blu_buf_T_0[y][x];
              red_buf_T_2[y][x] = red_buf_T_0[y][x];
              grn_buf_T_2[y][x] = grn_buf_T_0[y][x];
              blu_buf_T_2[y][x] = blu_buf_T_0[y][x];
              red_buf_T_3[y][x] = red_buf_T_0[y][x];
              grn_buf_T_3[y][x] = grn_buf_T_0[y][x];
```

HP REF. 10950676-1

-51-

```
            blu_buf_T_3[y][x] = blu_buf_T_0[y][x];
          }
          temp_int = z_buf_T_in_use[y][x] & 0x02;
          if(temp_int > 0) {                    /* sub-pixel 1 valid */
            sub_pix_1 = 1;
            new_z_1 = z_buf_T_1[y][x];
            if(sub_pix_0 == 0) {
              /* real HW has only one color sample/pixel,so
simulate:*/
              red_buf_T_2[y][x] = red_buf_T_1[y][x];
              grn_buf_T_2[y][x] = grn_buf_T_1[y][x];
              blu_buf_T_2[y][x] = blu_buf_T_1[y][x];
              red_buf_T_3[y][x] = red_buf_T_1[y][x];
              grn_buf_T_3[y][x] = grn_buf_T_1[y][x];
              blu_buf_T_3[y][x] = blu_buf_T_1[y][x];
            }
          }
          temp_int = z_buf_T_in_use[y][x] & 0x04;
          if(temp_int > 0) {                    /* sub-pixel 2 valid */
            sub_pix_2 = 1;
            new_z_2 = z_buf_T_2[y][x];
            if((sub_pix_0 == 0) && (sub_pix_1 == 0)) {
              /* real HW has only one color sample/pixel,so
simulate:*/
              red_buf_T_3[y][x] = red_buf_T_2[y][x];
              grn_buf_T_3[y][x] = grn_buf_T_2[y][x];
              blu_buf_T_3[y][x] = blu_buf_T_2[y][x];
            }
          }
          temp_int = z_buf_T_in_use[y][x] & 0x08;
          if(temp_int > 0) {                    /* sub-pixel 3 valid */
            sub_pix_3 = 1;
            new_z_3 = z_buf_T_3[y][x];
          } if(in_use_0 == 1){        /* sub_pixel 0 in use */
            old_z_0 = stored_z_buf[y][x];
            old_covers_saved ++;
          } if((debug == 1) &&(x == x_of_interset) && (y == y_of_interset))
{
          fprintf(stderr,"build hint_1\n");
        }
          if(hint_1 != 0) {         /* sub_pixel 1 in use */
            if(z_from_1 == 1)
              old_z_1 = old_z;
            else {
              old_z_1 = build_z_value(old_z,lead_1,msb_1);
              top_z_1 = build_top_z_value(old_z,lead_1,msb_1);
            }
```

HP REF. 10950676-1

-52-

```
              if(hint_1 == 1) old_covers_saved ++;
              if(hint_1 == 2) old_covers_lost ++;
              if(hint_1 == 3) old_covers_lost ++;
        if((debug == 1) &&(x == x_of_interset) && (y == y_of_interset))
{
              fprintf(stderr,"old_z_1 = %x top = %x ",old_z_1,top_z_1);
              }

} if(hint_2 != 0) {             /* sub_pixel 2 in use */
              if(z_from_2 == 1)
                old_z_2 = old_z;
              else {
                old_z_2 = build_z_value(old_z,lead_2,msb_2);
                top_z_2 = build_top_z_value(old_z,lead_2,msb_2);
                }
              if(hint_2 == 1) old_covers_saved ++;
              if(hint_2 == 2) old_covers_lost ++;
              if(hint_2 == 3) old_covers_lost ++;

if((debug == 1) && (x == x_of_interset) && (y == y_of_interset))
{
              fprintf(stderr,"old_z_2 = %x top = %x ",old_z_2,top_z_2);
              }

} if(hint_3 != 0) {             /* sub_pixel 3 in use */
              if(z_from_3 == 1)
                old_z_3 = old_z;
              else {
                old_z_3 = build_z_value(old_z,lead_3,msb_3);
                top_z_3 = build_top_z_value(old_z,lead_3,msb_3);
                }
              if(hint_3 == 1) old_covers_saved ++;
              if(hint_3 == 2) old_covers_lost ++;
              if(hint_3 == 3) old_covers_lost ++;
        if((debug == 1) &&(x == x_of_interset) && (y == y_of_interset))
{
              fprintf(stderr,"old_z_3 = %x top = %x",old_z_3,top_z_3);
              }

} if((debug == 1) &&(x == x_of_interset) && (y == y_of_interset))
{
              fprintf(stderr,"\n");
              }

/*************** start the real work ***************/
```

HP REF. 10950676-1

-53-

```
            sub_pixels = z_buf_T_in_use[y][x] & 0x0F;

if(sub_pixels != 0) {
                  r_z = 1;           /* track statistics */
               if(owns_it == 1) {
                      r_hints = 1;   /* track statistics */
                         /* NOTE: for now every pixel reads hint */
                  }
               } if((debug == 1) &&(x == x_of_interset) && (y == y_of_interset))
{
               fprintf(stderr,"at process pixel case %d big_hint = %d ",
                     sub_pixels,biggest_hint);
               fprintf(stderr,"old_z %d ",old_z);
               fprintf(stderr,"new_z 3-0 %x %x %x %x\n",
                     new_z_3,new_z_2,new_z_1,new_z_0);
            } switch(sub_pixels) { case 0x0:    /* case of NO sub_pixels will never happen
*/
                  fprintf(stderr,"ERROR-processing case of NO
sub_pixels\n");
                  break;

case 0x1:    /* new sub_pixel 0 is only one valid */
                  case 0x2:    /* new sub_pixel 1 is only one valid */
                  case 0x3:    /* new sub_pixel 0 and 1 are valid */
                  case 0x4:    /* new sub_pixel 2 is only one valid */
                  case 0x5:    /* new sub_pixel 0 and 2 valid */
                  case 0x6:    /* new sub_pixel 1 and 2 are valid */
                  case 0x7:    /* new sub_pixel 0, 1 and 2 are valid */
                  case 0x8:    /* new sub_pixel 3 is only one valid */
                  case 0x9:    /* new sub_pixel 0 and 3 are valid */
                  case 0xA:    /* new sub_pixel 1 and 3 are valid */
                  case 0xB:    /* new sub_pixel 1, 2 and 3 are valid */
                  case 0xC:    /* new sub_pixel 2 and 3 are valid */
                  case 0xD:    /* new sub_pixel 0, 2 and 3 are valid */
                  case 0xE:    /* new sub_pixel 1, 2 and 3 are valid */
                  case 0xF:    /* all 4 new sub_pixels are valid   */
                     if(in_use_0 == 1) {    /* old sub_sample 0 in use */
                        if(sub_pixels & 0x01) {   /* New sub_sample 0 */
                           if(z_buf_T_0[y][x] > old_z) { /* new wins Z*/
                              red_0 = red_buf_T_0[y][x];
                              green_0 = grn_buf_T_0[y][x];
                              blue_0 = blu_buf_T_0[y][x];
                           stored_z_buf[y][x] = z_buf_T_0[y][x];
                              w_z = 1;       /* track statistics */
                           z_update_done = 1;
```

```
                    in_use_0 = 1;
                    update_0 = 1;
                    update_needed ++;
                    }
                else {            /* old Z wins */
                /* in this case (of sub_sample 0) do nothing */
                }
                }
            }
            else {            /* old sub_sample 0 not in use */
               if(sub_pixels & 0x01) {  /* New sub_sample 0 */
                  red_0 = red_buf_T_0[y][x];
                  green_0 = grn_buf_T_0[y][x];
                  blue_0 = blu_buf_T_0[y][x];
               in_use_0 = 1;
                  update_hint = 1;
                  update_0 = 1;
                  update_needed ++;
               }
                else {            /* No data at zero */
               }
               }
            if(update_0 == 1)
                reference_z = z_buf_T_0[y][x]; /* use to build
hints*/
            else
                reference_z = old_z;      /* use to build new
hints*/

/******** work on sub pixel 1  *********/ if((update_0 == 0) && (z_from_0 == 0))
                reference_z = new_z_1;        /* it could be */ if((update_0 == 1) && (z_from_1 == 1)) {
               max_lead = lead_1;
               if(max_lead < 0) max_lead = 0;
               int_lead = build_lead_z(old_z,reference_z,max_lead);
               int_msb = build_msb_z(old_z,reference_z,max_lead);
               lead_1 = int_lead;
               msb_1 = int_msb;
               update_1_z = 1;
                  update_hint = 1;
               } if(sub_pixels & 0x02) {  /* New sub_sample 1 */
               if(hint_1 != 0) {     /* old sub_sample 1 in use */
                  if((new_z_1 > old_z_1) && (new_z_1 > top_z_1)) {
                                /* new wins Z*/
                     if(update_0 == 1) { /* matches sub_sample_0 */
                        hint_1 = 0x01;
```

```
                    red_1 = red_buf_T_1[y][x];
                    green_1 = grn_buf_T_1[y][x];
                    blue_1 = blu_buf_T_1[y][x];
                /* NOTE: in real system: for this case
                        int_lead, & int_msb are pre built */
                    max_lead = 21;
                    int_lead
=build_lead_z(new_z_1,reference_z,max_lead);
                    int_msb = build_msb_z(new_z_1,reference_z,max_lead);
                    lead_1 = int_lead;
                    msb_1 = int_msb;
                    }
                else {              /* does not match 0 */
                    if(biggest_hint == 1)
                        hint_1 = 0x02;
                    else
                        hint_1 = 0x03;
                        red_1 = red_buf_T_1[y][x];
                        green_1 = grn_buf_T_1[y][x];
                        blue_1 = blu_buf_T_1[y][x];
                    max_lead = 21;
int_lead=build_lead_z(new_z_1,reference_z,max_lead);
                    int_msb =
build_msb_z(new_z_1,reference_z,max_lead);
                    lead_1 = int_lead;
                    msb_1 = int_msb;
                }
                    update_hint = 1;
                update_1 = 1;
                update_1_z = 1;
                update_needed ++;
                }
                else {              /* old Z wins */
                if(new_z_1 <= old_z_1) { /* old lost */
                    if(update_0 == 1) {    /* new sub_sample 0 */
                    /* hint_1 = 0x03;*/ /* TONY check for 2 */
                    }
                    else {             /* old stuff wins */
                        /* don't update anything */
                    }
                }
                else {         /* could not resolve new_z */
                    update_needed = 1;
                    update_hint = 1;
                    hint_1 = 0x03;   /* force alised */
                    }
                }       /* end of old z wins */
            }               /* end of old sub-sample 1 in use */
            else {          /* old sub_sample 1 not in use */
                if(update_0 == 1) { /* new sub_sample 0 */
                    red_1 = red_buf_T_1[y][x];
```

-56-

```
                green_1 = grn_buf_T_1[y][x];
                blue_1 = blu_buf_T_1[y][x];
            hint_1 = 0x01;
            /* NOTE: in real system: for this case
                    int_lead, & int_msb are pre built */
            max_lead = 21;
            int_lead
=build_lead_z(new_z_1,reference_z,max_lead);
                int_msb = build_msb_z(new_z_1,reference_z,max_lead);
                lead_1 = int_lead;
                msb_1 = int_msb;
                    update_hint = 1;
                update_1 = 1;
                update_1_z = 1;
                    update_hint = 1;
                    update_needed ++;
                }
            else {              /* there is NOT a new sub 0 */
                if(biggest_hint == 0)   /* new pixel */
                    hint_1 = 0x02;
                else
                    hint_1 = 0x03;
                    red_1 = red_buf_T_1[y][x];
                    green_1 = grn_buf_T_1[y][x];
                    blue_1 = blu_buf_T_1[y][x];
                max_lead = 21;
                int_lead
=build_lead_z(new_z_1,reference_z,max_lead);
                int_msb = build_msb_z(new_z_1,reference_z,max_lead);
                lead_1 = int_lead;
                msb_1 = int_msb;
                    update_hint = 1;
                update_1 = 1;
                update_1_z = 1;
                    update_needed ++;
                }
            }
        }
        else {  /* there is not a new sub_sample 1 */
            if((update_0 == 1) && (hint_1 == 1)) { /* go to case 2
*/
                red_1 = good_RGB[y][x].bits.RED;
                green_1 = good_RGB[y][x].bits.GREEN;
                blue_1 = good_RGB[y][x].bits.BLUE;
                r_rgb = 1;          /* track statistics */
                update_1 = 1;
                hint_1 = 2;
                old_z_1 = build_z_value(old_z,lead_1,msb_1);
                max_lead = lead_1;
                if(max_lead < 0) max_lead = 0;
                int_lead =
build_lead_z(old_z_1,reference_z,max_lead);
```

```
                                -57-
                int_msb = build_msb_z(old_z_1,reference_z,max_lead);
                lead_1 = int_lead;
                msb_1 = int_msb;
                update_1_z = 1;
                update_hint = 1;
                }
            }

/******** work on sub pixel 2  *********/ if((update_0 == 0) && (z_from_0 == 0) && (update_1 == 0))
                reference_z = new_z_2;         /* it could be */ if(((update_0 == 1) || (update_1 == 1)) && (z_from_2 ==
1)){
                max_lead = lead_2;
                if(max_lead < 0) max_lead = 0;
                int_lead = build_lead_z(old_z,reference_z,max_lead);
                int_msb = build_msb_z(old_z,reference_z,max_lead);
                lead_2 = int_lead;
                msb_2 = int_msb;
                update_2_z = 1;
                update_hint = 1;
                } if(sub_pixels & 0x04) {  /* New sub_sample 2 */
              if(hint_2 != 0) {     /* old sub_sample 2 in use */
                if((new_z_2 > old_z_2) && (new_z_2 > top_z_2)) {
                                /* new wins Z*/
                  if(update_0 == 1) { /* matches sub_sample_0 */
                    hint_2 = 0x01;
                      red_2 = red_buf_T_2[y][x];
                      green_2 = grn_buf_T_2[y][x];
                      blue_2 = blu_buf_T_2[y][x];
                    /* NOTE: in real system: for this case
                        int_lead, & int_msb are pre built */
                    max_lead = 21;
                    int_lead
=build_lead_z(new_z_2,reference_z,max_lead);
                    int_msb = build_msb_z(new_z_2,reference_z,max_lead);
                    lead_2 = int_lead;
                    msb_2 = int_msb;
                    }
                  else {              /* does not match 0 */
                    if(biggest_hint == 1)
                        hint_2 = 0x02;
                    else
                        hint_2 = 0x03;
                      red_2 = red_buf_T_2[y][x];
                      green_2 = grn_buf_T_2[y][x];
                      blue_2 = blu_buf_T_2[y][x];
```

-58-

```
                        max_lead = 21;

int_lead=build_lead_z(new_z_2,reference_z,max_lead);
                        int_msb =
build_msb_z(new_z_2,reference_z,max_lead);
                        lead_2 = int_lead;
                        msb_2 = int_msb;
                    }
                        update_hint = 1;
                    update_2 = 1;
                    update_2_z = 1;
                    update_needed ++;
                    }
                    else {                  /* old Z wins */
                    if(new_z_2 <= old_z_2) { /* old lost */
                        if(update_0 == 1) {   /* new sub_sample 0 */
                        /* hint_2 = 0x03;*/ /* TONY check for 2 */
                        }
                        else {              /* old stuff wins */
                            /* don't update anything */
                        }
                    }
                    else {              /* could not resolve new_z */
                        update_needed = 1;
                        update_hint = 1;
                        hint_2 = 0x03;    /* force alised */
                        }
                    }           /* end of old z wins */
                }                   /* end of old sub-sample 2 in use */
                else {              /* old sub_sample 2 not in use */
                    if(update_0 == 1) { /* new sub_sample 0 */
                        red_2 = red_buf_T_2[y][x];
                        green_2 = grn_buf_T_2[y][x];
                        blue_2 = blu_buf_T_2[y][x];
                    hint_2 = 0x01;
                    /* NOTE: in real system: for this case
                            int_lead, & int_msb are pre built */
                        max_lead = 21;
                    int_lead
=build_lead_z(new_z_2,reference_z,max_lead);
                        int_msb = build_msb_z(new_z_2,reference_z,max_lead);
                    lead_2 = int_lead;
                    msb_2 = int_msb;
                        update_hint = 1;
                    update_2 = 1;
                    update_2_z = 1;
                        update_needed ++;
                    }
                    else {              /* there is NOT a new sub 0 */
                        if(biggest_hint == 0)  /* new pixel */
                        hint_2 = 0x02;
                        else
```

```
                                        -59-
                            hint_2 = 0x03;
                            red_2 = red_buf_T_2[y][x];
                            green_2 = grn_buf_T_2[y][x];
                            blue_2 = blu_buf_T_2[y][x];
                            max_lead = 21;
                        int_lead
=build_lead_z(new_z_2,reference_z,max_lead);
                            int_msb = build_msb_z(new_z_2,reference_z,max_lead);
                            lead_2 = int_lead;
                            msb_2 = int_msb;
                               update_hint = 1;
                            update_2 = 1;
                            update_2_z = 1;
                               update_needed ++;
                        }
                    }
                }
                else {  /* there is not a new sub_sample 2 */
                    if((update_0 == 1) && (hint_2 == 1)) {  /* go to case 2
*/
                        red_2 = good_RGB[y][x].bits.RED;
                        green_2 = good_RGB[y][x].bits.GREEN;
                        blue_2 = good_RGB[y][x].bits.BLUE;
                        r_rgb = 1;          /* track statistics */
                        update_2 = 1;
                        hint_2 = 2;
                        old_z_2 = build_z_value(old_z,lead_2,msb_2);
                        max_lead = lead_2;
                        if(max_lead < 0) max_lead = 0;
                        int_lead =
build_lead_z(old_z_2,reference_z,max_lead);
                        int_msb = build_msb_z(old_z_2,reference_z,max_lead);
                        lead_2 = int_lead;
                        msb_2 = int_msb;
                        update_2_z = 1;
                        update_hint = 1;
                    }
                }

/******** work on sub pixel 3  *********/ if((update_0 == 0) && (z_from_0 == 0) && (update_1 == 0)
&&
                    (update_2 == 0))
                reference_z = new_z_3;         /* it could be */ if(((update_0 == 1) || (update_1 == 1) || (update_2 ==
1))
                        && (z_from_3 == 1)){
                max_lead = lead_3;
                if(max_lead < 0) max_lead = 0;
```

-60-

```
                    int_lead = build_lead_z(old_z,reference_z,max_lead);
                    int_msb = build_msb_z(old_z,reference_z,max_lead);
                    lead_3 = int_lead;
                    msb_3 = int_msb;
                    update_3_z = 1;
                       update_hint = 1;
                    }
                 if(sub_pixels & 0x08) {  /* New sub_sample 3 */
                    if(hint_3 != 0) {    /* old sub_sample 3 in use */
                       if((new_z_3 > old_z_3) && (new_z_3 > top_z_3)) {
                                       /* new wins Z*/
                          if(update_0 == 1) { /* matches sub_sample_0 */
                             hint_3 = 0x01;
                                red_3 = red_buf_T_3[y][x];
                                green_3 = grn_buf_T_3[y][x];
                                blue_3 = blu_buf_T_3[y][x];
                          /* NOTE: in real system: for this case
                                int_lead, & int_msb are pre built */
                                max_lead = 21;
                                int_lead
=build_lead_z(new_z_3,reference_z,max_lead);
                             int_msb = build_msb_z(new_z_3,reference_z,max_lead);
                             lead_3 = int_lead;
                             msb_3 = int_msb;
                             }
                          else {            /* does not match 0 */
                             if(biggest_hint == 1)
                                hint_3 = 0x02;
                             else
                                hint_3 = 0x03;
                                red_3 = red_buf_T_3[y][x];
                                green_3 = grn_buf_T_3[y][x];
                                blue_3 = blu_buf_T_3[y][x];
                                max_lead = 21;
int_lead=build_lead_z(new_z_3,reference_z,max_lead);
                             int_msb =
build_msb_z(new_z_3,reference_z,max_lead);
                             lead_3 = int_lead;
                             msb_3 = int_msb;
                          }
                          update_hint = 1;
                          update_3 = 1;
                          update_3_z = 1;
                          update_needed ++;
                          }
                       else {              /* old Z wins */
                          if(new_z_3 <= old_z_3) { /* old lost */
                             if(update_0 == 1) {   /* new sub_sample 0 */
                             /* hint_3 = 0x03; */    /* TONY check for 2 */
                             }
```

-61-

```
                else {              /* old stuff wins */
                      /* don't update anything */
                }
            }
            else {              /* could not resolve new_z */
                update_needed = 1;
                update_hint = 1;
                hint_3 = 0x03;    /* force alised */
            }
          }            /* end of old z wins */
        }              /* end of old sub-sample 3 in use */
        else {            /* old sub_sample 3 not in use */
          if(update_0 == 1) { /* new sub_sample 0 */
               red_3 = red_buf_T_3[y][x];
               green_3 = grn_buf_T_3[y][x];
               blue_3 = blu_buf_T_3[y][x];
            hint_3 = 0x01;
            /* NOTE: in real system: for this case
                 int_lead, & int_msb are pre built */
               max_lead = 21;
            int_lead
=build_lead_z(new_z_3,reference_z,max_lead);
               int_msb = build_msb_z(new_z_3,reference_z,max_lead);
               lead_3 = int_lead;
               msb_3 = int_msb;
                update_hint = 1;
               update_3 = 1;
               update_3_z = 1;
                update_needed ++;
          }
          else {               /* there is NOT a new sub 0 */
            if(biggest_hint == 0)  /* new pixel */
               hint_3 = 0x02;
            else
               hint_3 = 0x03;
               red_3 = red_buf_T_3[y][x];
               green_3 = grn_buf_T_3[y][x];
               blue_3 = blu_buf_T_3[y][x];
               max_lead = 21;
            int_lead
=build_lead_z(new_z_3,reference_z,max_lead);
               int_msb = build_msb_z(new_z_3,reference_z,max_lead);
               lead_3 = int_lead;
               msb_3 = int_msb;
                update_hint = 1;
               update_3 = 1;
               update_3_z = 1;
                update_needed ++;
          }
        }
      }
      else {  /* there is not a new sub_sample 3 */
```

-62-

```
               if((update_0 == 1) && (hint_3 == 1)) {  /* go to case 2
*/
                 red_3 = good_RGB[y][x].bits.RED;
                 green_3 = good_RGB[y][x].bits.GREEN;
                 blue_3 = good_RGB[y][x].bits.BLUE;
                 r_rgb = 1;          /* track statistics */
                 update_3 = 1;
                 hint_3 = 2;
                 old_z_3 = build_z_value(old_z,lead_3,msb_3);
                 max_lead = lead_3;
                 if(max_lead < 0) max_lead = 0;
                 int_lead =
build_lead_z(old_z_3,reference_z,max_lead);
                 int_msb = build_msb_z(old_z_3,reference_z,max_lead);
                 lead_3 = int_lead;
                 msb_3 = int_msb;
                 update_3_z = 1;
                 update_hint = 1;
                 }
               }

/************ Update memory locations ************/
               good_old_red = good_RGB[y][x].bits.RED;
               good_old_green = good_RGB[y][x].bits.GREEN;
               good_old_blue = good_RGB[y][x].bits.BLUE;

red = 0;     /* clear it */
               green = 0;   /* clear it */
               blue = 0;    /* clear it */
               if(update_needed != 0) {
                 if(update_0 == 1) {
                 red = red + red_0;
                 green = green + green_0;
                 blue = blue + blue_0;
                 good_RGB[y][x].bits.RED = red_0;
                 good_RGB[y][x].bits.GREEN = green_0;
                 good_RGB[y][x].bits.BLUE = blue_0;
                     w_rgb = 1;      /* track statistics */
                 stored_z_buf[y][x] = z_buf_T_0[y][x];
                     w_z = 1;        /* track statistics */
                 }
                 else{
                 red = red + good_RGB[y][x].bits.RED;
                 green = green + good_RGB[y][x].bits.GREEN;
                 blue = blue + good_RGB[y][x].bits.BLUE;
                     r_rgb = 1;      /* track statistics */
                 } if(update_1 == 1) {
                 red = red + red_1;
```

HP REF. 10950676-1

```
                              -63-
              green = green + green_1;
              blue = blue + blue_1;
              }
              else {
              if(hint_1 == 3) {    /* resort to aliased */
                hint_1 = 0x03;
                red_1 = good_RGB[y][x].bits.RED;
                green_1 = good_RGB[y][x].bits.GREEN;
                blue_1 = good_RGB[y][x].bits.BLUE;
                    r_rgb = 1;          /* track statistics */
                if(update_0 == 1) {    /* find new z hint if needed
*/
                   if(update_1_z == 0) {
                          old_z_1 = build_z_value(old_z,lead_1,msb_1);
                          max_lead = lead_1;
                      if(max_lead < 0) max_lead = 0;
                      int_lead = build_lead_z(old_z_1,reference_z,
                                  max_lead);
                      int_msb = build_msb_z(old_z_1,reference_z,
                                  max_lead);
                      lead_1 = int_lead;
                      msb_1 = int_msb;
                      update_hint = 1;
                      }
                  }
                red = red + red_1;
                green = green + green_1;
                blue = blue + blue_1;
                }
              if(hint_1 == 2) {    /* find LOST color data */
              /****************************************
                  Lost color is algebraic mix of
                  Frame buffer data and saved sample:
                  LOST = ((4/covers_lost) *
                      (FB - (saved * (covers_saved/4))));
              ****************************************/
                hint_1 = 0x03;
                temp_red = good_old_red;     /* tony test */
                temp_green = good_old_green;      /* tony test */
                temp_blue = good_old_blue;   /* tony test */
                    r_rgb = 1;          /* track statistics */ temp_red1 = FB_RGB[y][x].bits.RED;
                temp_green1 = FB_RGB[y][x].bits.GREEN;
                temp_blue1 = FB_RGB[y][x].bits.BLUE;
                    r_fb = 1;           /* track statistics */ red_1 = (4.0/(1.0 * old_covers_lost)) *
                    ((1.0*temp_red1) - ((1.0*temp_red)*
                    ((1.0*old_covers_saved)/4.0)));
                green_1 = (4.0/(1.0 * old_covers_lost)) *
                    ((1.0*temp_green1) - ((1.0*temp_green)*
```

```
                          -64-

((1.0*old_covers_saved)/4.0)));
            blue_1 = (4.0/(1.0 * old_covers_lost)) *
                 ((1.0*temp_blue1) - ((1.0*temp_blue)*
                    ((1.0*old_covers_saved)/4.0)));

if(update_0 == 1) {    /* find new z hint if needed
*/
                if(update_1_z == 0) {
                    old_z_1 = build_z_value(old_z,lead_1,msb_1);
/* testing testing */
    old_z_1 = build_top_z_value(old_z,lead_1,msb_1);
    update_needed = 1;

max_lead = lead_1;
                    int_lead = build_lead_z(old_z_1,reference_z,
                                  max_lead);
                    int_msb = build_msb_z(old_z_1,reference_z,
                                  max_lead);
                    lead_1 = int_lead;
                    msb_1 = int_msb;
                    update_hint = 1;
                    }
                }
            red = red + red_1;
            green = green + green_1;
            blue = blue + blue_1;
          }
        if(hint_1 == 1) {
          if(update_0 == 1) hint_1 = 0x03; /* else stay 1 */
          red_1 = good_RGB[y][x].bits.RED;
          green_1 = good_RGB[y][x].bits.GREEN;
          blue_1 = good_RGB[y][x].bits.BLUE;
              r_rgb = 1;              /* track statistics */
          if(update_0 == 1) {    /* find new z hint if needed
*/
                if(update_1_z == 0) {
                    old_z_1 = build_z_value(old_z,lead_1,msb_1);
                    max_lead = 21;
                    int_lead = build_lead_z(old_z_1,reference_z,
                                  max_lead);
                    int_msb = build_msb_z(old_z_1,reference_z,
                                  max_lead);
                    lead_1 = int_lead;
                    msb_1 = int_msb;
                    update_hint = 1;
                    }
                }
            red = red + red_1;
            green = green + green_1;
            blue = blue + blue_1;
            }
```

```
                                -65-
        } if(update_2 == 1) {
    red = red + red_2;
    green = green + green_2;
    blue = blue + blue_2;
    }
    else {
    if(hint_2 == 3) {    /* resort to aliased */
      hint_2 = 0x03;
      red_2 = good_RGB[y][x].bits.RED;
      green_2 = good_RGB[y][x].bits.GREEN;
      blue_2 = good_RGB[y][x].bits.BLUE;
        r_rgb = 1;           /* track statistics */
      if(update_0 == 1) {    /* find new z hint if needed
*/
        if(update_2_z == 0) {
            old_z_2 = build_z_value(old_z,lead_2,msb_2);
            max_lead = lead_2;
            if(max_lead < 0) max_lead = 0;
            int_lead = build_lead_z(old_z_2,reference_z,
                        max_lead);
            int_msb = build_msb_z(old_z_2,reference_z,
                        max_lead);
            lead_2 = int_lead;
            msb_2 = int_msb;
            update_hint = 1;
            }
        }
      red = red + red_2;
      green = green + green_2;
      blue = blue + blue_2;
      }
    if(hint_2 == 2) {    /* find LOST color data */
      /*****************************************
          Lost color is algebraic mix of
          Frame buffer data and saved sample:
        LOST = ((4/covers_lost) *
            (FB - (saved * (covers_saved/4))));
      *****************************************/
      hint_2 = 0x03;
      temp_red = good_old_red;      /* tony test */
      temp_green = good_old_green;      /* tony test */
      temp_blue = good_old_blue;    /* tony test */
        r_rgb = 1;           /* track statistics */ temp_red2 = FB_RGB[y][x].bits.RED;
      temp_green2 = FB_RGB[y][x].bits.GREEN;
      temp_blue2 = FB_RGB[y][x].bits.BLUE;
        r_fb = 1;      /* track statistics */ red_2 = (4.0/(1.0 * old_covers_lost)) *
```

```
                                  -66-
                    ((1.0*temp_red2) - ((1.0*temp_red)*
                       ((1.0*old_covers_saved)/4.0))) ;
                  green_2 = (4.0/(1.0 * old_covers_lost)) *
                       ((1.0*temp_green2) - ((1.0*temp_green)*
                       ((1.0*old_covers_saved)/4.0))) ;
                  blue_2 = (4.0/(1.0 * old_covers_lost)) *
                       ((1.0*temp_blue2) - ((1.0*temp_blue)*
                       ((1.0*old_covers_saved)/4.0))) ;

if(update_0 == 1) {   /* find new z hint if needed
*/
                    if(update_2_z == 0) {
                        old_z_2 = build_z_value(old_z,lead_2,msb_2);

/* testing testing */
    old_z_2 = build_top_z_value(old_z,lead_2,msb_2);
    update_needed = 1;

max_lead = lead_2;
                        int_lead = build_lead_z(old_z_2,reference_z,
                                     max_lead);
                        int_msb = build_msb_z(old_z_2,reference_z,
                                     max_lead);
                        lead_2 = int_lead;
                        msb_2 = int_msb;
                        update_hint = 1;
                        }
                  }
                  red = red + red_2;
                  green = green + green_2;
                  blue = blue + blue_2;
                }
              if(hint_2 == 1) {
                if(update_0 == 1) hint_2 = 0x03; /* else stay 1 */
                red_2 = good_RGB[y][x].bits.RED;
                green_2 = good_RGB[y][x].bits.GREEN;
                blue_2 = good_RGB[y][x].bits.BLUE;
                  r_rgb = 1;         /* track statistics */
                if(update_0 == 1) {   /* find new z hint if needed
*/
                    if(update_2_z == 0) {
                        old_z_2 = build_z_value(old_z,lead_2,msb_2);
                        max_lead = 21;
                        int_lead = build_lead_z(old_z_2,reference_z,
                                     max_lead);
                        int_msb = build_msb_z(old_z_2,reference_z,
                                     max_lead);
                        lead_2 = int_lead;
                        msb_2 = int_msb;
                        update_hint = 1;
                        }
                  }
```

```
        red = red + red_2;
        green = green + green_2;
        blue = blue + blue_2;
      }
    } if(update_3 == 1) {
red = red + red_3;
green = green + green_3;
blue = blue + blue_3;
}
else {
if(hint_3 == 3) {    /* resort to aliased */
  hint_3 = 0x03;
  red_3 = good_RGB[y][x].bits.RED;
  green_3 = good_RGB[y][x].bits.GREEN;
  blue_3 = good_RGB[y][x].bits.BLUE;
     r_rgb = 1;            /* track statistics */
  if(update_0 == 1) {      /* find new z hint if needed
*/
     if(update_3_z == 0) {
          old_z_3 = build_z_value(old_z,lead_3,msb_3);
          max_lead = lead_3;
        if(max_lead < 0) max_lead = 0;
        int_lead = build_lead_z(old_z_3,reference_z,
                       max_lead);
        int_msb = build_msb_z(old_z_3,reference_z,
                       max_lead);
        lead_3 = int_lead;
        msb_3 = int_msb;
        update_hint = 1;
        }
     }
  red = red + red_3;
  green = green + green_3;
  blue = blue + blue_3;
  }
if(hint_3 == 2) {    /* find LOST color data */
/*****************************************
     Lost color is algebraic mix of
     Frame buffer data and saved sample:
   LOST = ((4/covers_lost) *
       (FB - (saved * (covers_saved/4))));
*****************************************/
   hint_3 = 0x03;
   temp_red = good_old_red;     /* tony test */
   temp_green = good_old_green;    /* tony test */
   temp_blue = good_old_blue;   /* tony test */
     r_rgb = 1;            /* track statistics */ temp_red3 = FB_RGB[y][x].bits.RED;
   temp_green3 = FB_RGB[y][x].bits.GREEN;
```

```
                                -68-
                    temp_blue3 = FB_RGB[y][x].bits.BLUE;
                        r_fb = 1;        /* track statistics */ red_3 = (4.0/(1.0 * old_covers_lost)) *
                        ((1.0*temp_red3) - ((1.0*temp_red)*
                        ((1.0*old_covers_saved)/4.0)));
                    green_3 = (4.0/(1.0 * old_covers_lost)) *
                        ((1.0*temp_green3) - ((1.0*temp_green)*
                        ((1.0*old_covers_saved)/4.0)));
                    blue_3 = (4.0/(1.0 * old_covers_lost)) *
                        ((1.0*temp_blue3) - ((1.0*temp_blue)*
                        ((1.0*old_covers_saved)/4.0)));

if(update_0 == 1) {     /* find new z hint if needed
*/
                      if(update_3_z == 0) {
                            old_z_3 = build_z_value(old_z,lead_3,msb_3);
        /* testing testing */
          old_z_3 = build_top_z_value(old_z,lead_3,msb_3);
          update_needed = 1;

max_lead = lead_3;
                            int_lead = build_lead_z(old_z_3,reference_z,
                                        max_lead);
                            int_msb = build_msb_z(old_z_3,reference_z,
                                        max_lead);
                            lead_3 = int_lead;
                            msb_3 = int_msb;
                            update_hint = 1;
                            }
                    }
                    red = red + red_3;
                    green = green + green_3;
                    blue = blue + blue_3;
                }
                if(hint_3 == 1) {
                  if(update_0 == 1) hint_3 = 0x03; /* else stay 1 */
                  red_3 = good_RGB[y][x].bits.RED;
                  green_3 = good_RGB[y][x].bits.GREEN;
                  blue_3 = good_RGB[y][x].bits.BLUE;
                    r_rgb = 1;        /* track statistics */
                  if(update_0 == 1) {     /* find new z hint if needed
*/
                      if(update_3_z == 0) {
                            old_z_3 = build_z_value(old_z,lead_3,msb_3);
                            max_lead = 21;
                            int_lead = build_lead_z(old_z_3,reference_z,
                                        max_lead);
                            int_msb = build_msb_z(old_z_3,reference_z,
                                        max_lead);
                            lead_3 = int_lead;
```

```
              -69-
         msb_3 = int_msb;
         update_hint = 1;
         }
      }
   red = red + red_3;
   green = green + green_3;
   blue = blue + blue_3;
   }
 } red = red / 4;
green = green / 4;
blue = blue / 4;
FB_RGB[y][x].bits.RED = red;
FB_RGB[y][x].bits.GREEN = green;
FB_RGB[y][x].bits.BLUE = blue;
draw_pixel(x,y,red,green,blue);

write_frame_buffer ++;   /* track statistics */ if(update_hint != 0) {
   hints.bits.owns_it = 1;
   hints.bits.in_use_0 = in_use_0;
   hints.bits.hint_1 = hint_1;
   hints.bits.hint_2 = hint_2;
   hints.bits.hint_3 = hint_3;
   hints.bits.msb_1 = msb_1;
   hints.bits.lead_1 = lead_1;
   hints.bits.msb_2 = msb_2;
   hints.bits.lead_2 = lead_2;
   hints.bits.msb_3 = msb_3;
   hints.bits.lead_3 = lead_3;
   z_buf_hints[y][x].all = hints.all;
w_hints ++;        /* track statistics */
   } if((update_0 == 0) && (in_use_0 == 0)) { /* chose z */
if((update_1 == 1) && (z_update_done == 0)) {
     stored_z_buf[y][x] = z_buf_T_1[y][x];
     w_z = 1;          /* track statistics */
   z_update_done = 1;
   }
if(hint_1 != 0) z_update_done = 1;
if((update_2 == 1) && (z_update_done == 0)) {
     stored_z_buf[y][x] = z_buf_T_2[y][x];
     w_z = 1;          /* track statistics */
   z_update_done = 1;
   }
if(hint_2 != 0) z_update_done = 1;
if((update_3 == 1) && (z_update_done == 0)) {
     stored_z_buf[y][x] = z_buf_T_3[y][x];
```

```
                              -70-
                        w_z = 1;          /* track statistics */
                    z_update_done = 1;
                    }
                }

}
            break;

default:           /* Can never get here */
                fprintf(stderr,"ERROR-trying to process EXTRA
sub_pixels\n");
                break;

}       /* End of CASE of sub_pixels */ if(r_hints == 1) read_hints ++;
            if(r_rgb == 1) read_good_rgb ++;
            if(r_fb == 1) read_frame_buffer ++;
            if(r_z == 1) read_z_buffer ++;
            if(w_hints == 1) write_hints ++;
            if(w_rgb == 1) write_good_rgb ++;
            if(w_z == 1) write_z_buffer ++;

}           /* End of update pixel */
          }             /* pixel in range */
        }               /* End of each x in triangle */
    }                   /* End of each y in triangle */
}
/**********************************************************************
*
          Build old Z value (approximate) from hint field         
**********************************************************************
/
int build_top_z_value(old_z,lead,msb)
int old_z;      /* old 24 bit Z value saved away */
int lead; /* 5 bits. Count of leading 1's or 0's */
int msb;  /* 3 bits. MSB's of Z value following count of 1's or 0's */

{
        int   one_or_zero;
        int   temp_z;
        int   my_mask;

one_or_zero = msb & 0x04;
        if(one_or_zero != 0) {    /* count is leading one's */
          msb = (~msb) & 0x0007;
          temp_z = (msb << 21) >> lead;
          temp_z = ~temp_z;
          my_mask = 0x001FFFFF >> lead;
```

```
                    temp_z = temp_z | my_mask;   /* force LSB to round up to all
1's*/
                    temp_z = temp_z + old_z;
                    if(temp_z < 0) temp_z = 0;                    /* underflowed */
                    if(temp_z > 0x00FFFFFF) temp_z = 0x00FFFFFF;   /* overflowed
*/
                    temp_z = temp_z & 0x00FFFFFF;
                    }
            else {                      /* count is leading zero's */
                  temp_z = (msb << 21) >> lead;
                  my_mask = 0x001FFFFF >> lead;
                  temp_z = temp_z | my_mask;   /* force LSB to round up to all
1's*/
                    temp_z = temp_z + old_z;
                    if(temp_z < 0) temp_z = 0;                    /* underflowed */
                    if(temp_z > 0x00FFFFFF) temp_z = 0x00FFFFFF;   /* overflowed
*/
                    temp_z = temp_z & 0x00FFFFFF;
                    } return(temp_z);
}
/***********************************************************************
*
          Build old Z value (approximate) from hint field           
***********************************************************************
/
int build_z_value(old_z,lead,msb)
int old_z;    /* old 24 bit Z value saved away */
int lead;  /* 5 bits. Count of leading 1's or 0's */
int msb;   /* 3 bits. MSB's of Z value following count of 1's or 0's */

{
            int   one_or_zero;
            int   temp_z;
            int   my_mask;

one_or_zero = msb & 0x04;
            if(one_or_zero != 0) {    /* count is leading one's */
              msb = (~msb) & 0x0007;
              temp_z = (msb << 21) >> lead;
              temp_z = ~temp_z;
              my_mask = 0x001FFFFF >> lead;
              my_mask = ~my_mask;
              temp_z = temp_z & my_mask;   /* force LSB to round down to 0 */
              temp_z = temp_z + old_z;
              if(temp_z < 0) temp_z = 0;                    /* underflowed */
              if(temp_z > 0x00FFFFFF) temp_z = 0x00FFFFFF;   /* overflowed
*/
              temp_z = temp_z & 0x00FFFFFF;
              }
            else {                      /* count is leading zero's */
```

```
                temp_z = (msb << 21) >> lead;
                temp_z = temp_z + old_z;
                if(temp_z < 0) temp_z = 0;                    /* underflowed */
                if(temp_z > 0x00FFFFFF) temp_z = 0x00FFFFFF;   /* overflowed
*/
                temp_z = temp_z & 0x00FFFFFF;
                } return(temp_z);
}
/************************************************************************
*
**              Build new Z lead value                              **
*************************************************************************
/
int build_lead_z(new_z,reference_z,max_lead)
int new_z;          /* new 24 bit Z value saved away */
int reference_z;    /* Z value of reference_z */
                    /* NOTE: in REAL system if this sample matches 0 then
                       lead value is precomputed per primitive */
int max_lead;       /* force z value guess to stay in range. (i.e. a bad
                       guess [large delta] can not tighten up with new
                       z value */

{
        int     delta_z;
        int     leading_cur;
        int     msb_cur;
        int     leading_bit;

leading_cur = 0;
        msb_cur = 0;
        new_z = new_z & 0x00FFFFFF;    /* should already be limited to 24
bits */
        reference_z = reference_z & 0x00FFFFFF;

delta_z = new_z - reference_z;
        if(delta_z < 0) {              /* delta is neg */
          leading_bit = (delta_z & 0x00800000) >> 23;
          while(leading_bit == 1) {    /* count the leading number of 0's
*/
                delta_z = delta_z << 1;
                leading_bit = (delta_z & 0x00800000) >> 23;
                if(leading_bit == 1) leading_cur ++;
                if(leading_cur == max_lead) leading_bit = 0;/* stop the
count*/
                }
          }
        else {                          /* delta is pos */
          leading_bit = (delta_z & 0x00800000) >> 23;
          while(leading_bit == 0) {    /* count the leading number of 0's
*/
```

-73-

```
            delta_z = delta_z << 1;
            leading_bit = (delta_z & 0x00800000) >> 23;
            if(leading_bit == 0) leading_cur ++;
            if(leading_cur == max_lead) leading_bit = 1;/* stop the
count*/
          }
        } return(leading_cur);
}
/************************************************************************
*
**              Build new Z msb value                            **
**      Note: this is same routine as above (except return value)     **
*************************************************************************
/
int build_msb_z(new_z,reference_z,max_lead)
int new_z;          /* new 24 bit Z value saved away */
int reference_z;    /* Z value of reference_z */
                    /* NOTE: in REAL system if this sample matches 0 then
                       lead value is precomputed per primitive */
int max_lead;       /* force z value guess to stay in range. (i.e. a bad
                       guess [large delta] can not tighten up with new
                       z value */

{
        int   delta_z;
        int   leading_cur;
        int   msb_cur;
        int   leading_bit;

leading_cur = 0;
        msb_cur = 0;
        new_z = new_z & 0x00FFFFFF;/* should already be limited to
24bits*/
        reference_z = reference_z & 0x00FFFFFF;

delta_z = new_z - reference_z;
        if(delta_z < 0) {               /* delta is neg */
          leading_bit = (delta_z & 0x00800000) >> 23;
          while(leading_bit == 1) {   /* count the leading number of 0's
*/
            delta_z = delta_z << 1;
            leading_bit = (delta_z & 0x00800000) >> 23;
            if(leading_bit == 1) leading_cur ++;
            if(leading_cur == max_lead) leading_bit = 0;/* stop the
count*/
          }
        }
        else {                          /* delta is pos */
          leading_bit = (delta_z & 0x00800000) >> 23;
```

```
        while(leading_bit == 0) {    /* count the leading number of 0's */
            delta_z = delta_z << 1;
            leading_bit = (delta_z & 0x00800000) >> 23;
            if(leading_bit == 0) leading_cur ++;
            if(leading_cur == max_lead) leading_bit = 1;/* stop the count*/
        }
    }
    msb_cur = (delta_z & 0x01C00000) >> 22;

return(msb_cur);
}
```

Wherefore, the following is claimed:

1. A system for increasing speed and minimizing memory requirements and accesses in an antialiasing graphics system, comprising:

a graphics system;

a frame buffer associated with said graphics system;

a memory controller associated with said graphics system for controlling said frame buffer; and an antialiasing system associated with the memory controller, said antialiasing system configured to receive a color value and a depth dimension for a plurality of subpixel locations within a pixel in said digitized image in said frame buffer and configured to store in said frame buffer color data including a current display value that corresponds to said pixel, a reference color value that corresponds to one subpixel location, a reference depth dimension that corresponds with said one subpixel location, and reconstruction indicia that can be utilized to derive respective depth dimensions based on said reference depth dimension and to derive colors for other subpixel locations based on said reference color value, wherein one of said other subpixel locations corresponds to a different color than a color of a second one of said other subpixel locations.

2. The system of claim 1, wherein said antialiasing system is configured to derive, as said reconstruction indicia, the following:

for each of said subpixel locations, a subpixel color hint regarding a respective subpixel location and a subpixel depth dimension hint regarding depth of said respective subpixel location; and a full pixel hint for said respective pixel as a whole, said full pixel hint regarding usage of said subpixel locations.

3. The system of claim 1, wherein said antialiasing system is configured to derive, as said reconstruction indicia, the following:

a subpixel hint and a subpixel depth dimension difference for each of said subpixel locations, said subpixel hint indicating one of the following: said subpixel location is not in use, said subpixel location is in use and a respective color value matches said reference color value, said subpixel location is in use and said respective color value is a mix with said reference color value, and said subpixel location is in use and said respective color value is unknown; and said subpixel depth dimension difference being derived by mathematically combining said reference depth dimension and a subpixel depth dimension; and a full pixel hint for said respective pixel as a whole, said full pixel hint indicating one of the following: said respective pixel is not in use, said respective pixel has all subpixels in use, a first subpixel location is not in use and at least one other subpixel location is in use, and a last subpixel location is in use.

4. The system of claim 1, wherein said antialiasing system is configured (a) to receive a new subpixel color and a new subpixel depth dimension pertaining to a subpixel location, (b) to retrieve said color data from said frame buffer that corresponds to a respective pixel having said subpixel location, (c) to derive new color data with a new display color based upon (i) said new subpixel color and said new subpixel depth dimension, (ii) said reference color value, (iii) said reference depth dimension, and (iv) said reconstruction indicia, and (d) to store said new color data with said new display color in said frame buffer.

5. The system of claim 1, further comprising a span stepper configured to provide said color value and said depth dimension to said antialiasing system within said memory controller.

6. The system of claim 1, wherein said color data corresponding with each said pixel defines color and depth information pertaining to four subpixel locations within said pixel.

7. The system of claim 1, wherein said reconstruction indicia provide enough information to derive color and depth dimension values for three subpixel locations.

8. The system of claim 1, wherein said antialiasing system comprises:

a color control processor configured (a) to receive a new subpixel color and a new subpixel depth dimension pertaining to a subpixel location, (b) to retrieve said color data from said frame buffer that corresponds to a respective pixel have said subpixel location, (c) to derive new color data with a new display color based upon (i) said new subpixel color and said new subpixel depth dimension, (ii) said reference color value, (iii) said reference depth dimension, and (iv) said reconstruction indicia, and (d) to store said new color data with said new display color in said frame buffer; and a coprocessor associated with said color control processor, said coprocessor configured to compute depth dimension differences for said subpixel locations, said depth dimension differences being part of said reconstruction indicia, each said depth dimension difference defining a distance between a corresponding subpixel location and said reference depth dimension of said color data, said coprocessor configured to communicate said depth dimension differences to said color control processor.

9. The system of claim 1, wherein said antialiasing system comprises:

a color control processor configured (a) to receive a new subpixel color and a new subpixel depth dimension pertaining to a subpixel location, (b) to retrieve said color data from said frame buffer that corresponds to a respective pixel having said subpixel location, (c) to derive new color data with a new display color based upon (i) said new subpixel color and said new subpixel depth dimension, (ii) said reference color value, (iii) said reference depth dimension, and (iv) said reconstruction indicia, and (d) to store said new color data with said new display color in said frame buffer; and a plurality of coprocessors in communication with said color control processor, each said coprocessor associated with a respective subpixel location, each said coprocessor configured to compute a depth dimension difference being part of said reconstruction indicia, each said depth dimension difference defining a distance between said respective subpixel location and said reference depth dimension of said color data, each said coprocessor configured to communicate said respective depth dimension difference to said color control processor.

10. The system of claim 1, wherein said antialiasing system includes color mix logic configured to produce a new display color using an algebraic equation, based upon said display color, said reference color, and said reconstruction indicia.

11. A system for increasing speed and minimizing memory requirements and accesses in an antialiasing graphics system, comprising;

a graphics system;

a frame buffer associated with said graphics system;

a memory controller associated with said graphics system for controlling said frame buffer; and an antialiasing system associated with the memory controller, said antialiasing system configured to receive a color value and a depth dimension at a plurality of subpixel locations within a pixel in said digitized image in said frame buffer and configured to store in said frame buffer color data including a current display value that corresponds to said pixel, a reference color value that corresponds to one subpixel location, a reference depth dimension that corresponds with said one subpixel location, and reconstruction indicia that can be utilized to derive respective depth dimensions and colors for other subpixel locations, wherein said antialiasing system is configured to derive, as said reconstruction indicia, the following:

for each of said subpixel locations, a subpixel color hint regarding a respective subpixel location and a subpixel depth dimension hint regarding depth of said respective subpixel location; and a full pixel hint for said respective pixel as a whole, said full pixel hint regarding usage of said subpixel locations, wherein said antialiasing system comprises a means for compressing data lengths associated with respective depth dimension hints and storing respective approximate depth dimension differences.

12. A system for increasing speed and minimizing memory requirements and accesses in an antialiasing graphics system, comprising:

a graphics system;

a frame buffer associated with said graphics system;

a memory controller associated with said graphics system for controlling said frame buffer; and an antialiasing system associated with the memory controller, said antialiasing system configured to receive a color value and a depth dimension at a plurality of subpixel locations with a pixel in said digitized image in said frame buffer and configured to store in said frame buffer color data including a current display value that corresponds to said pixel, a reference color value that corresponds to one subpixel location, a reference depth dimension that corresponds with said one subpixel location, and reconstruction indicia that can be utilized to derive respective depth dimensions and colors for other subpixel locations, wherein said antialiasing system is configured to derive, as said reconstruction indicia, the following:

a subpixel hint and a subpixel depth dimension difference for each of said subpixel locations, said subpixel hint indicating one of the following: said subpixel location is not in use, said subpixel location is in use and a respective color value matches said reference color value, said subpixel location is in use and said respective color value is a mix with said reference color value, and said subpixel location is in use and said respective color value is unknown, and said subpixel depth dimension difference being derived by mathematically combining said reference depth dimension and a subpixel depth dimension; and a full pixel hint for said respective pixel as a whole, said full pixel hint indicating one of the following: said respective pixel is not in use, said respective pixel has all subpixels in use, a first subpixel location is not in use and at least one other subpixel location is in use, and a last subpixel location is in use, wherein said subpixel hint, said subpixel depth dimension difference, and said full pixel hint are each defined by 2 bits.

13. The system of claim 9, wherein said color data corresponding with each said pixel is defined by color and depth information pertaining to four subpixel locations within said pixel and wherein said antialiasing system includes three coprocessors.

14. An antialiasing system for increasing speed and minimizing memory requirements and accesses in a graphics system, the antialiasing system for enhancing the quality of a digitized image, comprising:

means for determining color values and depth dimensions at a plurality of subpixel locations within pixels in said digitized image; and means for storing in memory color data pertaining to each of said pixels, said color data including a current display value that corresponds to said pixel, a reference color value that corresponds to one subpixel location, a reference depth dimension that corresponds with said one subpixel location, and reconstruction indicia that can be utilized to derive respective depth dimensions based on said reference dimension and to derive various colors for other subpixel locations based on said reference color value, wherein one of said other subpixel locations corresponds to a different color than a color of a second one of said other subpixel locations.

15. A computer readable medium having a computer program relating to an antialiasing system for increasing speed and minimizing memory requirements and accesses in a graphics system, the antialiasing system for enhancing the quality of a digitized image, comprising:

means for receiving color values and depth dimensions at a plurality of subpixel locations within pixels in said digitized image; and means for producing color data for memory pertaining to each of said pixels, said color data including a current display value that corresponds to said pixel, a reference color value that corresponds to one subpixel location, a reference depth dimension that corresponds with said one subpixel location, and reconstruction indicia that can be utilized to derive respective depth dimensions based on said reference depth dimension and to derive colors for other subpixel locations based on said reference color value, wherein one of said other subpixel locations corresponds to a different color than a color of a second one of said other subpixel locations.

16. A computer having antialiasing capabilities in a graphics system for enhancing the quality of a digitized image, comprising:

(a) a processor;

(b) a memory;

(c) a graphics system;

(d) an interface interconnecting said processor, said memory and said graphics system;

(e) a frame buffer associated with said graphics system;

(f) a memory controller associated with said graphics system for controlling said frame buffer;

(g) an antialiasing system associated with the memory controller, said antialiasing system comprising:

(1) a mechanism for determining a color value and a depth dimension at a plurality of subpixel locations within a pixel in said digitized image in said frame buffer; and (2) a mechanism for storing in said frame buffer color data including a current display value that corresponds to said pixel, a reference color value that corresponds to one subpixel location, a reference depth dimension that corresponds with said one subpixel location, and reconstruction indicia that can be utilized to derive respective depth dimensions based on said reference depth dimension and to derive colors for other subpixel locations based on said reference color value, wherein one of said other subpixel locations corresponds to a different color than a color of a second one of said other subpixel locations;

whereby said color data can be retrieved from said frame buffer, and an antialiased display color can be produced from said color data.

17. A method for increasing speed and minimizing memory requirements and accesses in an antialiasing system of a graphics system, the antialiasing system for enhancing the quality of a digitized image, comprising the steps of:

determining color value and depth dimensions at subpixel locations within pixels in said digitized image; and storing color data for each of said pixels, said color data including a current display value that corresponds to a respective pixel, a reference color value that corresponds to one subpixel location within said respective pixel, a reference depth dimension that corresponds with said one subpixel location, and reconstruction indicia that can be utilized to derive respective depth dimensions based on said reference depth dimension and to derive colors for other subpixel locations within said respective pixel based on said reference color value, wherein one of said other subpixel locations corresponds to a different color than a color of a second one of said other subpixel locations.

18. The method of claim 17, further comprising the step of storing, as said reconstruction indicia, the following:

for each of said subpixel locations, a subpixel hint regarding color of a respective subpixel and a depth dimension hint regarding depth; and a full pixel hint for said respective pixel as a whole, said full pixel hint regarding usage of said subpixel locations.

19. The method of claim 17, further comprising the step of storing, as said reconstruction indicia, the following:

a subpixel hint and a subpixel depth dimension difference for each of said subpixel locations, said hint indicating one of the following: said subpixel location is not in use, said subpixel location is in use and a respective color value matches said reference color value, said subpixel location is in use and said respective color value is a mix with said reference color value, and said subpixel location is in use and said respective color value is unknown; and said subpixel depth dimension difference being derived by mathematically combining said reference depth dimension and a respective depth dimension; and a full pixel hint for said respective pixel as a whole, said full pixel hint indicating one of the following: said respective pixel is not in use, said respective pixel has all subpixels in use, a first subpixel location is not in use and at least one other subpixel location is in use, and a last subpixel location is in use.

20. The method of claim 17, further comprising the steps of:

retrieving said display color; and driving said display color to a display.

21. The method of claim 17, further comprising the steps of:

receiving a new subpixel color and new subpixel depth dimension;

retrieving said color data;

deriving new color data having a new display color based upon said new subpixel color, said new subpixel depth dimension, said reference color value, said reference depth dimension, and said reconstruction indicia; and storing said new color.

22. The method of claim 17, further comprising the step of receiving said color values and said depth dimensions at subpixel locations within pixels from a span stepper.

23. The method of claim 17, further comprising the step of defining color and depth information pertaining to four subpixel locations with said color data.

24. The method of claim 17, further comprising the step of providing enough information in said reconstruction indicia to derive color and depth dimension values for three subpixel locations.

25. The method of claim 17, further comprising the steps of:

implementing a color control processor configured (a) to receive a new subpixel color and a new subpixel depth dimension pertaining to a subpixel location, (b) to retrieve said color data from said frame buffer that corresponds to a respective pixel having said subpixel location, (c) to derive new color data with a new display color based upon (i) said new subpixel color and said new subpixel depth dimension, (ii) said reference color value, (iii) said reference depth dimension, and (iv) said reconstruction indicia, and (d) to store said new color data with said new display color in said frame buffer; and associating a coprocessor with said color processor, said coprocessor configured to compute depth dimenion differences for said subpixel locations, said depth dimension differences being part of said reconstruction indicia, each said depth dimension difference defining a distance between a corresponding subpixel location and said reference depth dimension of said color data, said coprocessor configured to communicate said depth dimension differences to said color control processor.

26. The method of claim 17, further comprising the steps of:

implementing a color control processor configured (a) to receive a new subpixel color and a new subpixel depth dimension pertaining to a subpixel location, (b) to retrieve said color data from said frame buffer that corresponds to a respective pixel having said subpixel location, (c) to derive new color data with a new display color based upon (i) said new subpixel color and said new subpixel depth dimension, (ii) said reference color value, (iii) said reference depth dimension, and (iv) said reconstruction indicia, and (d) to store said new color data with said new display color in said frame buffer; and associating a plurality of coprocessor with said color processor, each said coprocessor associated with a respective subpixel location, each said coprocessor configured to compute depth dimenion differences for said respective subpixel location, said depth dimension differences being part of said reconstruction indicia, each said depth dimension difference defining a distance between said respective subpixel location and said reference depth dimension of said color data, said coprocessor configured to communicate said respective depth dimension differences to said color control processor.

27. The method of claim 17, further comprising the step of producing a new display color using an algebraic equation, based upon said display color, said reference color, and said reconstruction indicia.

28. A method for increasing speed and minimizing memory requirements and accesses in an antialiasing system of a graphics system, the antialiasing system for enhancing the quality of a digitized image, comprising the steps of:

determining color value and depth dimensions at subpixel locations within pixels in said digitized image;

storing color data for each of said pixels, said color data including a current display value that corresponds to a respective pixel, a reference color value that corresponds to one subpixel location within said respective pixel, a reference depth dimension that corresponds with said one subpixel location, and reconstruction indicia that can be utilized to derive respective depth dimensions and colors for other subpixel locations within said respective pixel;

compressing data lengths associated with respective depth dimension differences and storing respective approximate depth dimension differences; and storing, as said reconstruction indicia, the following:
a subpixel hint and a subpixel depth dimension difference for each of said subpixel locations; said hint indicating one of the following: said subpixel location is not in use, said subpixel location is in use and a respective color value matches said reference color value, said subpixel location is in use and said respective color value is a mix with said reference color value, and said subpixel location is in use and said respective color value is unknown; and said subpixel depth dimension difference being derived by mathematically combining said reference depth dimension and a respective depth dimension; and a full pixel hint for said respective pixel as a whole, said full pixel hint indicating one of the following: said respective pixel is not in use, said respective pixel has all subpixels in use, a first subpixel location is not in use and at least one other subpixel location is in use, and a last subpixel location is in use.

29. A method for increasing speed and minimizing memory requirements and accesses in an antialiasing system of a graphics system, the antialiasing system for enhancing the quality of a digitized image, comprising the steps of:

determining color value and depth dimensions at subpixel locations within pixels in said digitized image; and storing color data for each of said pixels, said color data including a current display value that corresponds to a respective pixel, a reference color value that corresponds to one subpixel location within said respective pixel, a reference depth dimension that corresponds with said one subpixel location, and reconstruction indicia that can be utilized to derive respective depth dimensions and colors for other subpixel locations within said respective pixel;

implementing said subpixel hints, said subpixel depth dimension differences, and said full pixel hint each with 2 logic bits; and storing, as said reconstruction indicia, the following:
a subpixel hint and a subpixel depth dimension difference for each of said subpixel locations, said hint indicating one of the following: said subpixel location is not in use, said subpixel location is in use and a respective color value matches said reference color value, said subpixel location is in use and said respective color value is a mix with said reference color value, and said subpixel location is in use and said respective color value is unknown, and said subpixel depth dimension difference being derived by mathematically combining said reference depth dimension and a respective depth dimension; and a full pixel hint for said respective pixel as a whole, said full pixel hint indicating one of the following: said respective pixel is not in use, said respective pixel has all subpixels in use, a first subpixel location is not in use and at least one other subpixel location is in use, and a last subpixel location is in use.

30. The method of claim 26, further comprising the steps of:

defining color and depth information pertaining to four subpixel locations with said color data; and implementing three coprocessors, each dedicated to a corresponding subpixel location.

31. The system of claim 1, wherein said reference color value corresponds to a new subpixel color value associated with said one subpixel location.

32. The system of claim 1, wherein said reference color value is a subpixel color value associated with said one subpixel location.

33. The system of claim 14, wherein said reference color value corresponds to a new subpixel color value associated with said one subpixel location.

34. The system of claim 15, wherein said reference color value corresponds to a new subpixel color value associated with said one subpixel location.

35. The system of claim 16, wherein said reference color value corresponds to a new subpixel color value associated with said one subpixel location.

36. The system of claim 17, wherein said reference color value corresponds to a new subpixel color value associated with said one subpixel location.

* * * * *